(12) United States Patent
Kim et al.

(10) Patent No.: US 12,339,703 B2
(45) Date of Patent: Jun. 24, 2025

(54) ELECTRONIC DEVICE INCLUDING HINGE STRUCTURE

(71) Applicant: SAMSUNG ELECTRONICS CO., LTD., Suwon-si (KR)

(72) Inventors: Taejeong Kim, Suwon-si (KR); Byounggyu Park, Suwon-si (KR); Hyunsuk Choi, Suwon-si (KR); Jongkeun Kim, Suwon-si (KR); Jusung Maeng, Suwon-si (KR); Garam Lee, Suwon-si (KR); Kyunghwan Song, Suwon-si (KR); Kidoc Son, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 272 days.

(21) Appl. No.: 18/306,425

(22) Filed: Apr. 25, 2023

(65) Prior Publication Data

US 2024/0031461 A1 Jan. 25, 2024

Related U.S. Application Data

(63) Continuation of application No. PCT/KR2023/005150, filed on Apr. 17, 2023.

(30) Foreign Application Priority Data

Jul. 20, 2022 (KR) .................... 10-2022-0089441
Sep. 16, 2022 (KR) .................... 10-2022-0117435

(51) Int. Cl.
*G06F 1/16* (2006.01)
(52) U.S. Cl.
CPC .......... *G06F 1/1618* (2013.01); *G06F 1/1616* (2013.01); *G06F 1/1652* (2013.01)

(58) Field of Classification Search
CPC .... G06F 1/1652; G06F 1/1616; G06F 1/1618; G06F 1/1681; G06F 1/16; H04M 1/022; H04M 1/0268
See application file for complete search history.

(56) References Cited

U.S. PATENT DOCUMENTS 11,624,221 B1 * 4/2023 Hsu .................... E05D 3/122
16/354
11,832,405 B2 * 11/2023 Zhang ................... F16C 11/04
(Continued)

FOREIGN PATENT DOCUMENTS

CN 112911033 6/2021
KR 20140091274 A 7/2014
(Continued)

OTHER PUBLICATIONS

Search Report and Written Opinion dated Jul. 13, 2023 issued in International Patent Application No. PCT/KR2023/005150.

*Primary Examiner* — Sagar Shrestha
(74) *Attorney, Agent, or Firm* — Nixon & Vanderhye, P.C.

(57) ABSTRACT

According to an embodiment of the disclosure, an electronic device may comprise a first housing, a second housing, a hinge structure, and/or a flexible display. The hinge structure may be rotatably connect the second housing to the first housing. The flexible display may be at least partially bendable in response to the rotation of the second housing relative to the first housing. The hinge structure may include at least one rotating member, at least one detent member, and/or at least one pin member. The rotating member may include a first detent member coupled to the first housing and rotatable about a first rotational axis and/or a second detent member coupled to the second housing and rotatable about a second rotational axis parallel to the first rotational axis. The detent member may include a first detent member (Continued)

disposed in the first rotating member and including a first detent slot and/or a second detent member disposed in the second rotating member and including a second detent slot. The pin member may include a first pin member slidably connected to the first detent slot and/or a second pin member slidably connected to the second detent slot. The first detent member may be configured to provide an elastic force to the first pin member. The second detent member may be configured to provide an elastic force to the second pin member.

20 Claims, 22 Drawing Sheets

(56) References Cited

U.S. PATENT DOCUMENTS

| | | | | |
|---|---|---|---|---|
| 11,977,421 | B2* | 5/2024 | Yang | E05D 11/082 |
| 12,058,276 | B2* | 8/2024 | Jiang | H04M 1/022 |
| 2020/0267244 | A1* | 8/2020 | Kim | G06F 1/1641 |
| 2020/0348732 | A1 | 11/2020 | Kang et al. | |
| 2021/0037361 | A1 | 2/2021 | Zhang et al. | |
| 2021/0165466 | A1 | 6/2021 | Kang et al. | |
| 2021/0173449 | A1* | 6/2021 | Yao | G06F 1/1616 |
| 2021/0243908 | A1* | 8/2021 | Park | G06F 1/1616 |
| 2021/0250431 | A1* | 8/2021 | Park | G06F 1/1652 |
| 2021/0295753 | A1 | 9/2021 | Li | |
| 2022/0070285 | A1 | 3/2022 | Ge | |
| 2022/0116489 | A1* | 4/2022 | Nagai | G06F 1/1652 |
| 2022/0303371 | A1* | 9/2022 | Liao | H04M 1/0268 |
| 2022/0311843 | A1 | 9/2022 | Kim et al. | |
| 2022/0377919 | A1* | 11/2022 | Zhang | H04M 1/022 |
| 2023/0409090 | A1* | 12/2023 | Hong | G09F 9/30 |

FOREIGN PATENT DOCUMENTS

| | | |
|---|---|---|
| KR | 20200126524 A | 11/2020 |
| KR | 102228223 B1 | 3/2021 |
| KR | 102336736 B1 | 12/2021 |
| KR | 10-2022-0028364 | 3/2022 |
| KR | 102382288 B1 | 4/2022 |
| KR | 10-2022-0069755 | 5/2022 |
| KR | 10-2021-0068880 | 6/2022 |
| WO | 2021/115462 | 6/2021 |
| WO | 2022/119360 | 6/2022 |

* cited by examiner

US 12,339,703 B2

ELECTRONIC DEVICE INCLUDING HINGE STRUCTURE

CROSS-REFERENCE TO RELATED APPLICATIONS

This application is a continuation of International Application No. PCT/KR2023/005150 designating the United States, filed on Apr. 17, 2023, in the Korean Intellectual Property Receiving Office and claiming priority to Korean Patent Application No. 10-2022-0089441, filed on Jul. 20, 2022, in the Korean Intellectual Property Office, and to Korean Patent Application No. 10-2022-0117435, filed on Sep. 16, 2022, in the Korean Intellectual Property Office, the disclosures of all of which are incorporated by reference herein in their entireties.

BACKGROUND

Field

The disclosure relates to a hinge structure including a detent member and a foldable electronic device including the same.

Description of Related Art

With the development of information and communication technology and semiconductor technology, various functions are being integrated into one portable electronic device. For example, an electronic device may implement not only communication functions but also entertainment functions, such as playing games, multimedia functions, such as playing music and videos, communication and security functions for mobile banking, and scheduling and/or e-wallet functions. Such electronic devices become compact enough for users to carry in a convenient way.

As mobile communication services extend up to multimedia service sectors, electronic devices require a larger display to allow users satisfactory use of multimedia services as well as voice call or text messaging services. This, however, trades off the trend of electronic devices being compact.

SUMMARY

According to an example embodiment of the disclosure, an electronic device may comprise a first housing, a second housing, a hinge structure, and/or a flexible display. The hinge structure rotatably connect the second housing to the first housing. The flexible display may be at least partially bendable in response to the rotation of the second housing relative to the first housing. The hinge structure may include at least one rotating member, at least one detent member, and/or at least one pin member. The rotating member may include a first detent member coupled to the first housing and rotatable about a first rotational axis and/or a second detent member coupled to the second housing and rotatable about a second rotational axis parallel to the first rotational axis. The detent member may include a first detent member disposed in the first rotating member and including a first detent slot and/or a second detent member disposed in the second rotating member and including a second detent slot. The pin member may include a first pin member slidably connected to the first detent slot and/or a second pin member slidably connected to the second detent slot. The first detent member may be configured to provide an elastic force to the first pin member. The second detent member may be configured to provide an elastic force to the second pin member.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
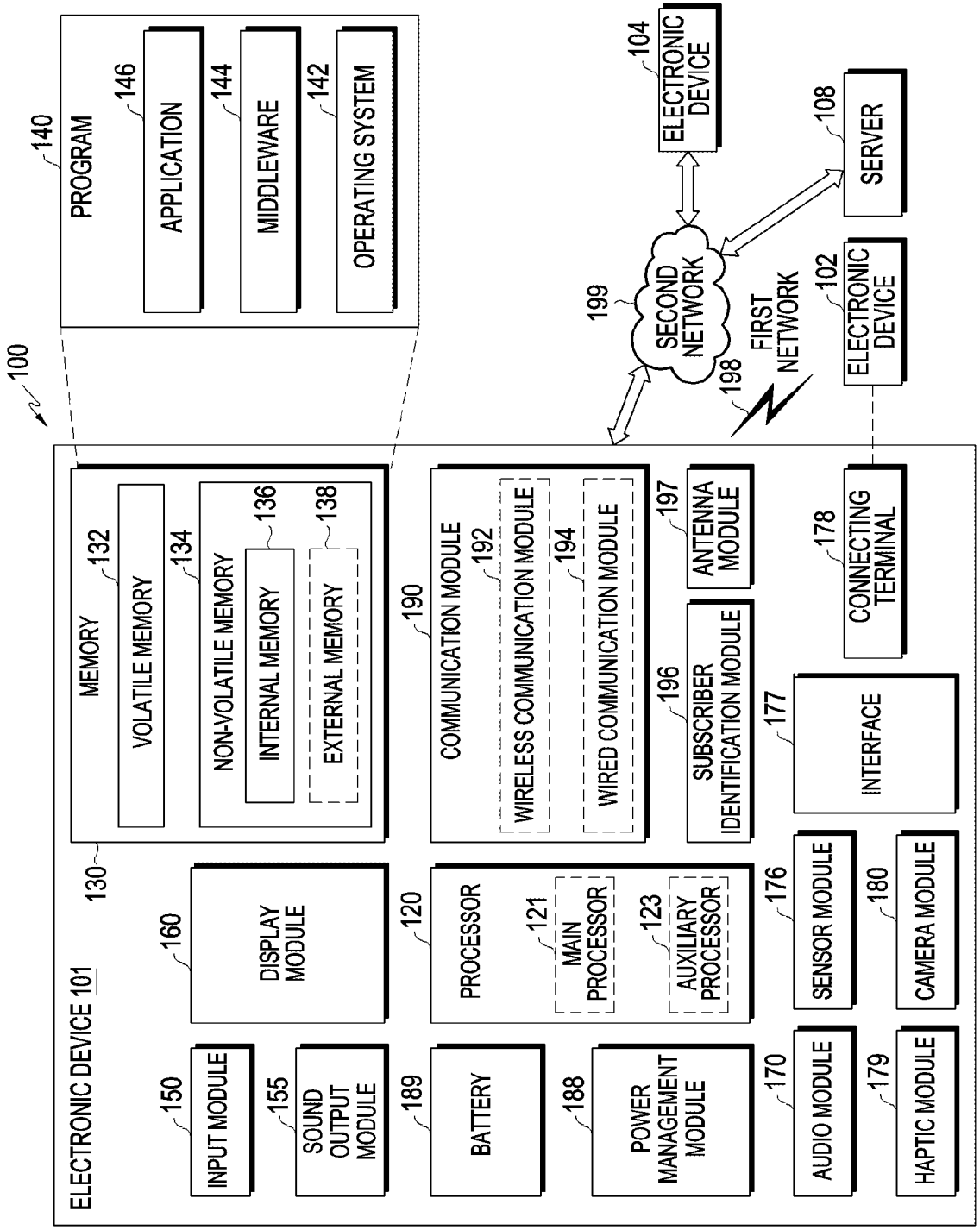
FIG. 1 is a block diagram illustrating an electronic device in a network environment according to an embodiment of the disclosure.

FIG. 1 is a block diagram illustrating an example electronic device in a network environment according to an embodiment of the disclosure.

Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. In an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

In the following detailed description, a length direction, a width direction, and/or a thickness direction of the electronic device may be mentioned and may refer, for example, to a 'Y-axis direction,' 'X-axis direction', and/or 'Z-axis direction,' respectively. In an embodiment, 'negative/positive (−/+)' may be mentioned together with the Cartesian coordinate system illustrated in the drawings with respect to the direction in which the component is oriented. For example, the front surface of the electronic device or housing may refer, for example, to a 'surface facing in the +Z direction,' and the rear surface may refer, for example, to a 'surface facing in the −Z direction'. In an embodiment, the side surface of the electronic device or housing may include an area facing in the +X direction, an area facing in the +Y direction, an area facing in the −X direction, and/or an area facing in the −Y direction. In an embodiment, the 'X-axis direction' may include both the '−X direction' and the '+X direction'. It should be noted that the directions are illustrated with respect to the Cartesian coordinate system shown in the drawings for the sake of brevity of description, and the description of these directions or components do not limit an embodiment of the disclosure. For example, the direction in which the front surface or rear surface faces may be varied depending on the unfolded state or folded state of the electronic device, and the above-mentioned directions may be interpreted as different ones depending on the user's way to grip.

Figure 2:
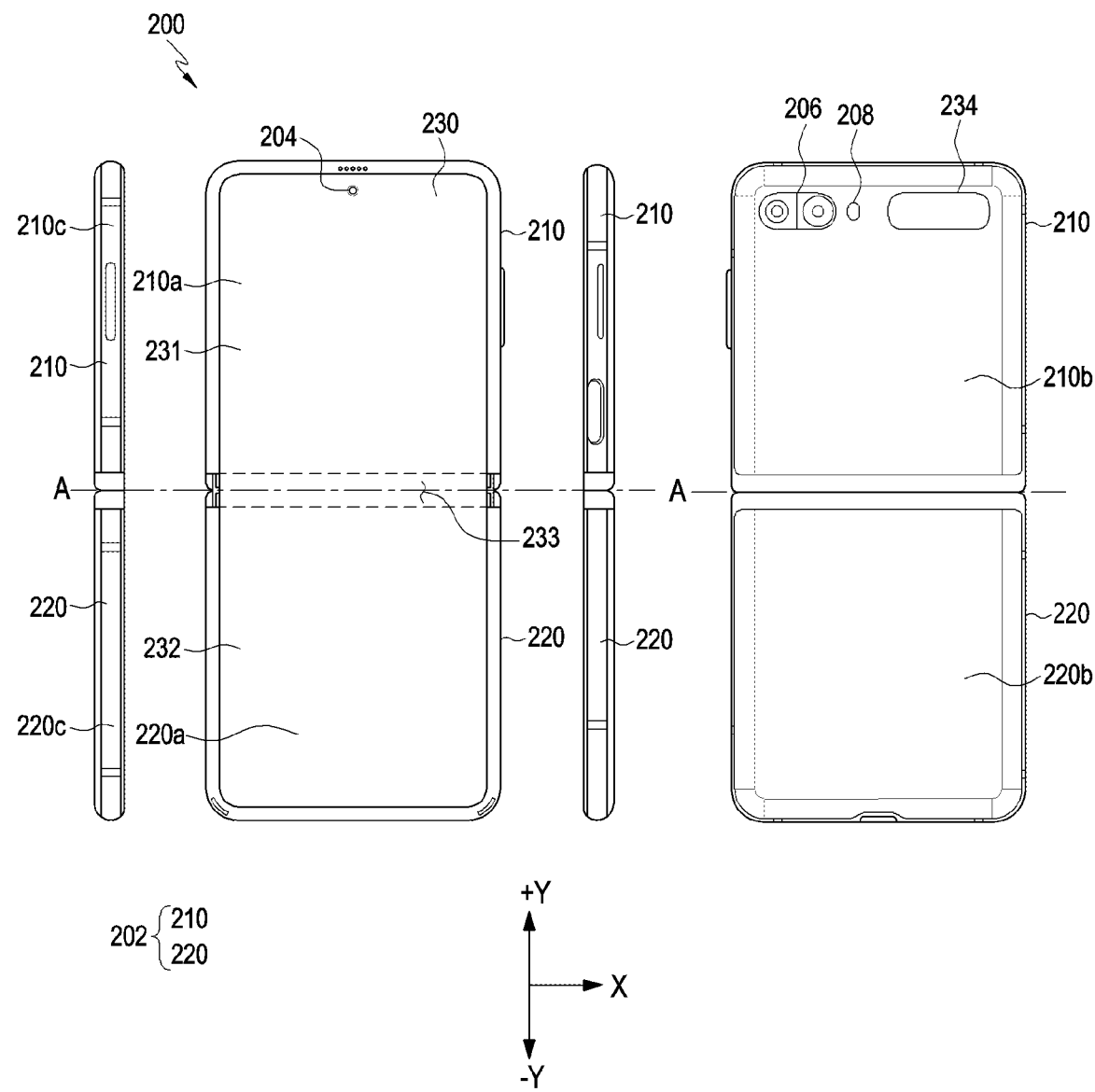
FIG. 2 is a diagram illustrating an unfolded state of an electronic device according to an embodiment of the disclosure.
Figure 3:
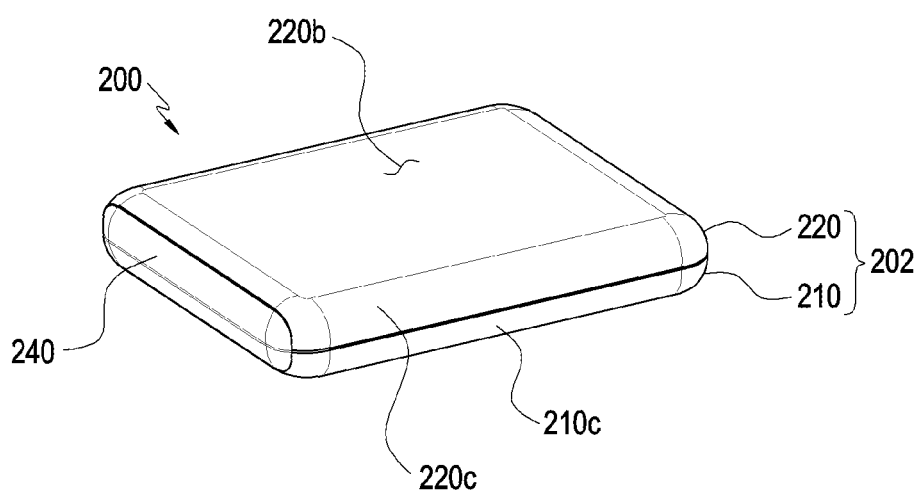
FIG. 3 is a diagram illustrating a folded state of an electronic device according to an embodiment of the disclosure.

FIG. 2 is a diagram illustrating an unfolded state of an electronic device according to an embodiment of the disclosure. FIG. 3 is a diagram illustrating a folded state of an electronic device according to an embodiment of the disclosure. The configuration of the electronic device 200 of FIGS. 2 and 3 may be identical in whole or part to the configuration of the electronic device 101 of FIG. 1.

The unfolded state of the electronic device of FIG. 2 may be defined as an open flexible display, and the folded state of the electronic device of FIG. 3 may be defined as a closed flexible display. According to an embodiment, the unfolded state may be defined as at least one of an open state, an expanded state, a stretched state, an unbended state, or a first state. The folded state may be defined as at least one of a closed state, a bended state, or a second state.

Referring to FIGS. 2 and 3, an electronic device 200 may include a housing 202 for receiving components (e.g., the battery 250 and/or circuit board 260 of FIG. 4) of the electronic device 200 and a flexible display or foldable display 230 (hereinafter, the display 230) connected to the housing 202. According to an embodiment, the housing 202 may be referred to as a foldable housing.

According to an embodiment, the housing 202 may include a first housing 210 and a second housing 220 configured to relatively rotate about the first housing 210.

According to an embodiment, the first housing 210 and/or the second housing 220 may form a portion of the exterior of the electronic device 200. According to an embodiment, the surface where the display 230 is visually exposed (e.g., visible) may be a front surface (e.g., a first front surface 210a and a second front surface 220a) of the electronic device 200 and/or housing 202. As used herein when referring to the display, the terms "visually exposed", "exposed", "visible" or the like may be used interchangeably and include a display having a cover glass, cover layer, protective layer, etc. covering the display. A surface opposite to the front surface may be a rear surface (e.g., a first rear surface 210b and a second rear surface 220b) of the electronic device 200. A surface surrounding at least a portion of the space between the front surface and the rear surface may be a side surface (e.g., the first side surface 210c and the second side surface 220c) of the electronic device 200.

According to an embodiment, the second housing 220 may be connected to be rotatable about the first housing 210. For example, the first housing 210 and the second housing 220 may be rotatably connected to each other by a hinge structure (e.g., the hinge structure 280 of FIG. 4) disposed therebetween. The electronic device 200 may turn into a folded state (e.g., FIG. 2) and unfolded state (e.g., FIG. 3). In the folded state of the electronic device 200, the first front surface 210a may face the second front surface 220a and, in the unfolded state, the direction in which the first front surface 210a faces may be the same as the direction in which the second front surface 220a faces. For example, in the unfolded state, the first front surface 210a may be positioned on substantially the same plane as the second front surface 220a. According to an embodiment, the first housing 210 may receive rotational force of the second housing 202 using an interlocking structure (e.g., the interlocking structure 330 of FIG. 6) and rotate in conjunction with the second housing 220. In contrast, the second housing 220 may receive rotational force of the first housing 210 using an interlocking structure (e.g., the interlocking structure 330 of FIG. 6) and rotate in conjunction with the first housing 210.

According to an embodiment, the first housing 210 and the second housing 220 are disposed on both sides of the folding axis A and be overall symmetrical in shape with respect to the folding axis A. The angle between the first housing 210 and the second housing 220 may be changed depending on whether the electronic device 200 is in the unfolded state, the folded state, or an intermediate state between the unfolded state and the folded state.

According to an embodiment, the electronic device 200 may include a hinge cover 240. At least a portion of the hinge cover 240 may be disposed between the first housing 210 and the second housing 220. According to an embodiment, the hinge cover 240 may be hidden by a portion of the first housing 210 and second housing 220 or be exposed to the outside depending on the state of the electronic device 200. According to an embodiment, the hinge cover 240 may protect the hinge structure (e.g., the hinge structure 280 of FIG. 4) from an external impact of the electronic device 200. According to an embodiment, the hinge cover 240 may be referred to as a hinge housing.

According to an embodiment, as shown in FIG. 2, in the unfolded state of the electronic device 200, the hinge cover 240 may be hidden, and thus not exposed, by the first housing 210 and the second housing 220. As another example, as shown in FIG. 3, in the folded state (e.g., a fully folded state) of the electronic device 200, the hinge cover 240 may be exposed to the outside between the first housing 210 and the second housing 220. As another example, in an intermediate state in which the first housing 210 and the second housing 220 are folded with a certain angle, the hinge cover 240 may be partially exposed to the outside between the first housing 210 and the second housing 220. In this case, however, the exposed area may be smaller than in the fully folded state. According to an embodiment, the hinge cover 240 may include a curved surface.

According to an embodiment, as shown in FIG. 3, when the electronic device 200 is in a folded state (e.g., a fully folded state), an edge of the first housing 210 and an edge of the second housing 220 adjacent to the hinge structure (e.g., the hinge structure 280 of FIG. 4) may be in contact with each other without space. According to an embodiment, when the electronic device 200 is in a folded state (e.g., in a fully folded state), an edge of the first housing 210 and an edge of the second housing 220 adjacent to the hinge structure 280 may be spaced apart from each other. For example, when the electronic device 200 is in a folded state, a space may be formed between the edge of the first housing 210 and the edge of the second housing 220 adjacent to the hinge structure 280. A distance between the first housing 210 and the second housing 220 within the space may decrease as it is goes away from the hinge structure. According to an embodiment, when the electronic device 200 is in a folded state, as a space is formed between the first housing 210 and the second housing 220 to correspond to the folding area 233 of the display 230, stress of the display 230 may be reduced or prevented.

According to an embodiment, the display 230 may visually provide information to the outside (e.g., the user) of the electronic device 200. The display 230 may include, for example, a hologram device, or a projector and control circuitry to control a corresponding one of the display, hologram device, and projector. According to an embodiment, the display 230 may include a touch sensor configured to detect a touch, or a pressure sensor configured to measure the intensity of a force generated by the touch.

According to an embodiment, the display 230 may refer, for example, to a display at least a portion of which may be transformed into a flat or curved surface. For example, the display 230 may be formed to be transformable in response to the motion of the second housing 220 relative to the first housing 210. According to an embodiment, the display 230 may include a folding area 233, a first display area 231 disposed on one side of the folding area 233 (e.g., the upper (+Y) direction), and a second display area 232 disposed on the opposite side of the folding area 233 (e.g., lower (−Y) direction). According to an embodiment, in the unfolded state (e.g., FIG. 2) of the electronic device 200, the folding area 233 may be positioned above (in the +Z-axis direction) the hinge structure (e.g., the hinge structure 280 of FIG. 4). For example, at least a portion of the folding area 233 may face the hinge structure (e.g., the hinge structure 280 of FIG. 4). According to an embodiment, the folding area 233 may be referred to as a portion of the display 230 at least a portion of which is bent based on the state change (e.g., unfolding or folding) of the electronic device 200. According to an embodiment, the first display area 231 may be disposed on the first housing 210, and the second display area 232 may be disposed on the second housing 220. According to an embodiment, the display 230 may be received in the first housing 210 and the second housing 220.

However, the segmentation of the display 230 as shown in FIG. 2 is merely an example, and the display 230 may be divided into a plurality of (e.g., four or more, or two) areas depending on the structure or function of the display 200.

Further, in the embodiment illustrated in FIG. 2, the area of the display 230 may be segmented by the folding area 233 or folding axis (axis A) extending in parallel with the X axis but, in an embodiment, the display 230 may also be segmented with respect to other folding area (e.g., a folding area parallel with the Y axis) or other folding axis (e.g., a folding axis parallel with the Y axis). According to an embodiment, the display 230 may be coupled with or disposed adjacent to a touch detection circuit, a pressure sensor capable of measuring the strength (pressure) of touches, and/or a digitizer for detecting a magnetic field-type stylus pen.

According to an embodiment, the electronic device 200 may include a rear display 234. The rear display 234 may be disposed to face in a different direction from the display 230. For example, the display 230 may be visually exposed (e.g., visible) through the front surface (e.g., the first front surface 210a and/or the second front surface 220a) of the electronic device 200, and the rear display 234 may be visually exposed (e.g., visible) through the rear surface (e.g., the first rear surface 210b) of the electronic device 200.

According to an embodiments, the electronic device 200 may include at least one camera module 204 and 206 and a flash 208. According to an embodiment, the electronic device 200 may include a front camera module 204 exposed through the front surface (e.g., the first front surface 210a) and/or a rear camera module 206 exposed through the rear surface (e.g., the first rear surface 210b). The camera modules 204 and 206 may include one or more lenses, an image sensor, a flash, and/or an image signal processor. The flash 208 may include a light emitting diode (LED) or a xenon lamp. According to an embodiment, two or more lenses (an infrared (IR) camera, a wide-angle lens, and a telescopic lens) and image sensors may be disposed on one surface of the electronic device 200. The configuration of the front camera module 204 and/or rear camera module 206 may be identical in whole or part to the configuration of the camera module 180 of FIG. 1.

Figure 4:
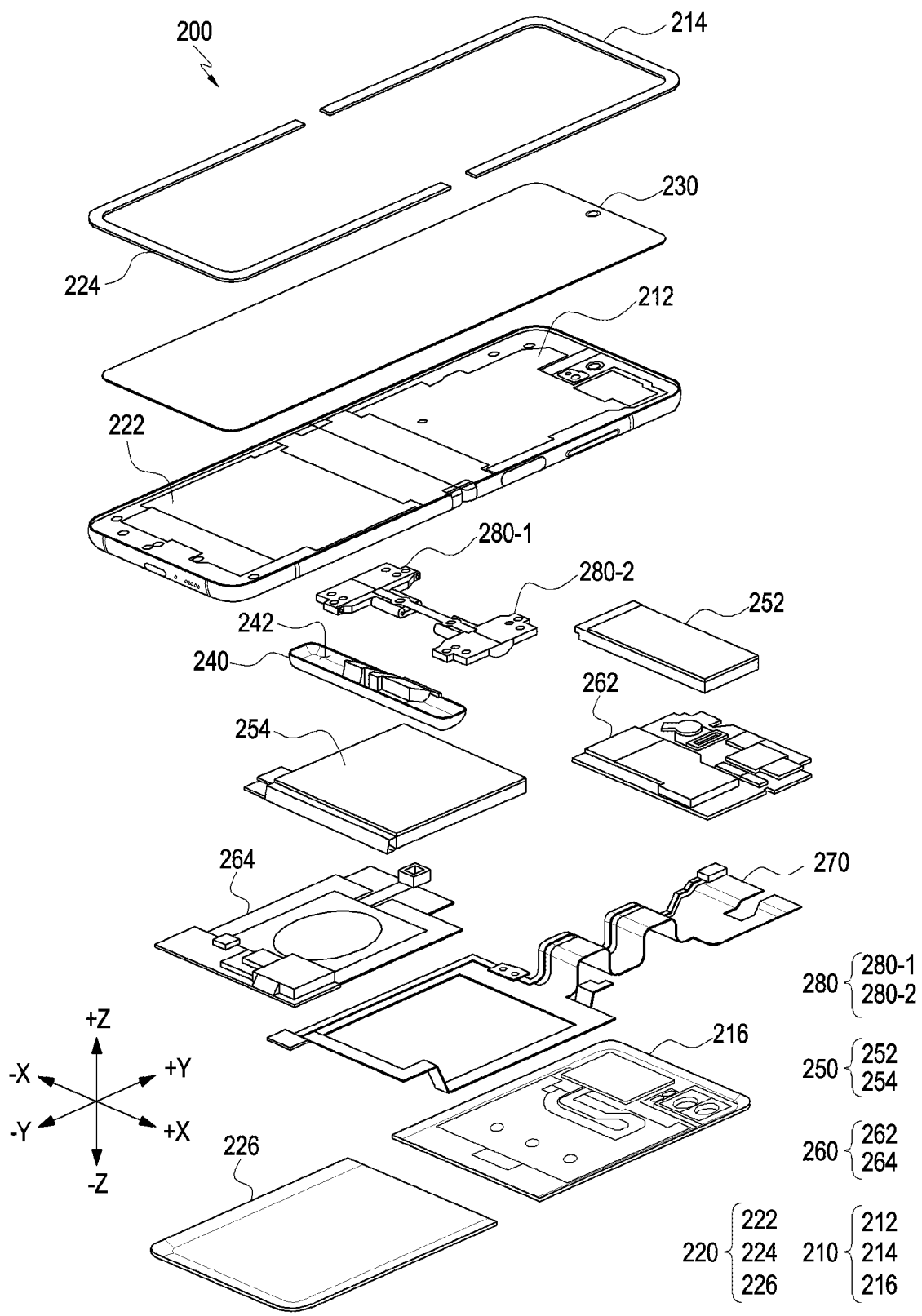
FIG. 4 is an exploded perspective view illustrating an electronic device according to an embodiment of the disclosure.

FIG. 4 is an exploded perspective view illustrating an electronic device according to an embodiment of the disclosure.

Referring to FIG. 4, an electronic device 200 may include a first housing 210, a second housing 220, a display 230, a hinge cover 240, a battery 250, a printed circuit board 260, a flexible printed circuit board 270, and/or a hinge structure 280. The configuration of the first housing 210, the second housing 220, the display 230, and the hinge cover 240 of FIG. 4 may be identical in whole or part to the configuration of the first housing 210, the second housing 220, the display 230, and the hinge cover 240 of FIGS. 2 and/or 3.

According to an embodiment, the electronic device 200 may include a first supporting member 212 or a second supporting member 222. For example, the first housing 210 may include a first supporting member 212, and the second housing 220 may include a second supporting member 222. According to an embodiment, the first supporting member 212 and/or the second supporting member 222 may support components (e.g., the display 230, the battery 250, and the printed circuit board 260) of the electronic device 200.

According to an embodiment, the first supporting member 212 and/or the second supporting member 222 may be formed of a metal material and/or a non-metal (e.g., polymer) material. According to an embodiment, the first supporting member 212 may be disposed between the display 230 and the battery 250. For example, the display 230 may be coupled to one surface of the first supporting member 212, and the battery 250 and the printed circuit board 260 may be disposed on the other surface.

According to an embodiment, the electronic device 200 may include a first protection member 214 or a second protection member 224. For example, the first housing 210 may include a first protection member 214, and the second housing 220 may include a second protection member 224. According to an embodiment, the protection members 214 and 224 may protect the display 230 from external impact. For example, the first protection member 214 may surround at least a portion of a portion (e.g., the first display area 231 of FIG. 1) of the display 230, and the second protection member 224 may surround at least a portion of another portion (e.g., the second display area 232 of FIG. 1) of the display 230. According to an embodiment, the first protection member 214 may be referred to as a first deco member, and the second protection member 214 may be referred to as a second deco member.

According to an embodiment, the housings 210 and 220 may include a first rear plate 216 and a second rear plate 226. For example, the first housing 210 may include a first rear plate 216 connected to the first supporting member 212, and the second housing 220 may include a second rear plate 226 connected to the second supporting member 222. According to an embodiment, the rear plates 216 and 226 may form at least a portion of the exterior of the electronic device 200. For example, the first rear plate 216 may form a first rear surface (e.g., the first rear surface 210b of FIG. 1), and the second rear plate 226 may form a second rear surface (e.g., the second rear surface 220b of FIG. 1). According to an embodiment, the first battery 252 and the first printed circuit board 262 may be disposed between the first supporting member 212 and the first rear plate 216. The second battery 254 and the second printed circuit board 264 may be disposed between the second supporting member 222 and the second rear plate 226.

According to an embodiment, the hinge cover 240 may receive at least a portion of the hinge structure 280. For example, the hinge cover 240 may include a receiving recess 242 for receiving the hinge structure 280. According to an embodiment, the hinge cover 240 may be coupled to the hinge structure 280. According to an embodiment, in the unfolded state of the electronic device 200, at least a portion of the hinge cover 240 may be positioned between the hinge structure 280 and the housings 210 and 220. According to an embodiment, the hinge cover 240 may guide movement of the housings 210 and 220. For example, the first housing 210 and the second housing 220 each may rotate about the hinge cover 240 in a state connected to the hinge cover 240.

According to an embodiment, the battery 250 may be a device for supplying power to at least one component of the electronic device 200. The battery 189 may include a primary cell which is not rechargeable, a secondary cell which is rechargeable, or a fuel cell. The battery 250 may be integrally or detachably disposed inside the electronic device 200. According to an embodiment, the battery 250 may include a first battery 252 disposed in the first housing 210 and a second battery 254 disposed in the second housing 220. For example, the first battery 252 may be disposed on the first supporting member 212. The second battery 254 may be disposed on the second supporting member 222.

According to an embodiment, a processor (e.g., the processor 120 of FIG. 1), a memory (e.g., the memory 130 of FIG. 1), and/or an interface (e.g., the interface 177 of FIG. 1) may be mounted on the printed circuit board 260. According to an embodiment, the printed circuit board 260 may include a first printed circuit board 262 disposed in the first housing 210 and a second printed circuit board 264 disposed in the second housing 220.

According to an embodiment, the flexible printed circuit board 270 may electrically connect a component (e.g., first printed circuit board 262) positioned in the first housing 210 with a component (e.g., first printed circuit board 262) positioned in the second housing 220. According to an embodiment, at least a portion of the flexible printed circuit board 270 may cross the hinge cover 240 and/or the hinge structure 280. For example, a portion of the flexible printed circuit board 270 may be disposed in the first housing 210, and another portion thereof may be disposed in the second housing 220. According to an embodiment, the flexible printed circuit board 270 may include a first flexible printed circuit board connected to an antenna and a second flexible printed circuit board connected to the display 230.

According to an embodiment, the hinge structure 280 may include a plurality of hinge structures 280-1 and 280-2 disposed in parallel. For example, the hinge structure 280 may include a first hinge structure 280-1 and a second hinge structure 280-2 spaced apart from the first hinge structure 280-1. According to an embodiment, the first hinge structure 280-1 may be symmetrical with the second hinge structure 280-2 with respect to the length direction (e.g., Y-axis direction) of the electronic device 200. According to an embodiment, the hinge structure 280 may be omitted according to an embodiment of the electronic device 200.

Figure 5:
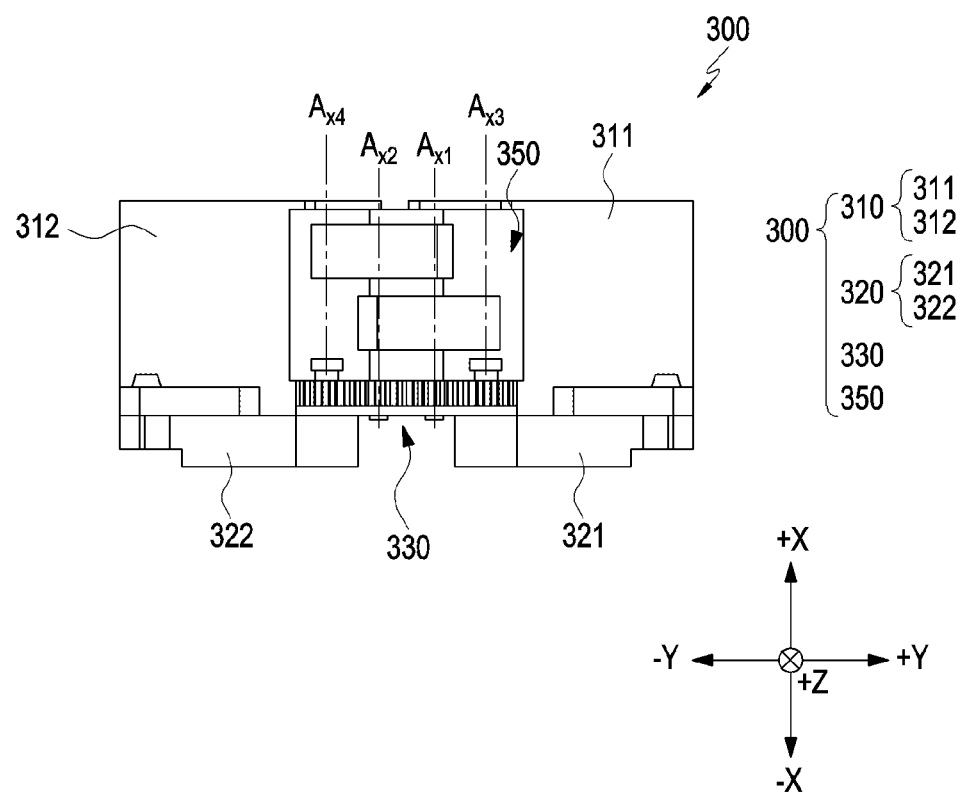
FIG. 5 is a diagram illustrating a rear view of a hinge structure according to an embodiment of the disclosure.
Figure 6:
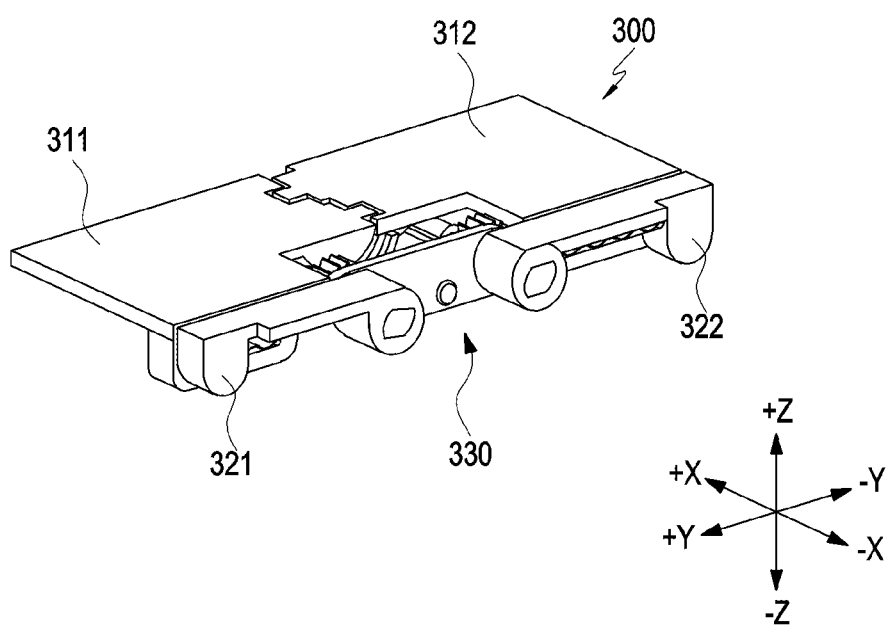
FIG. 6 is a perspective view illustrating a hinge structure according to an embodiment of the disclosure.
Figure 7:
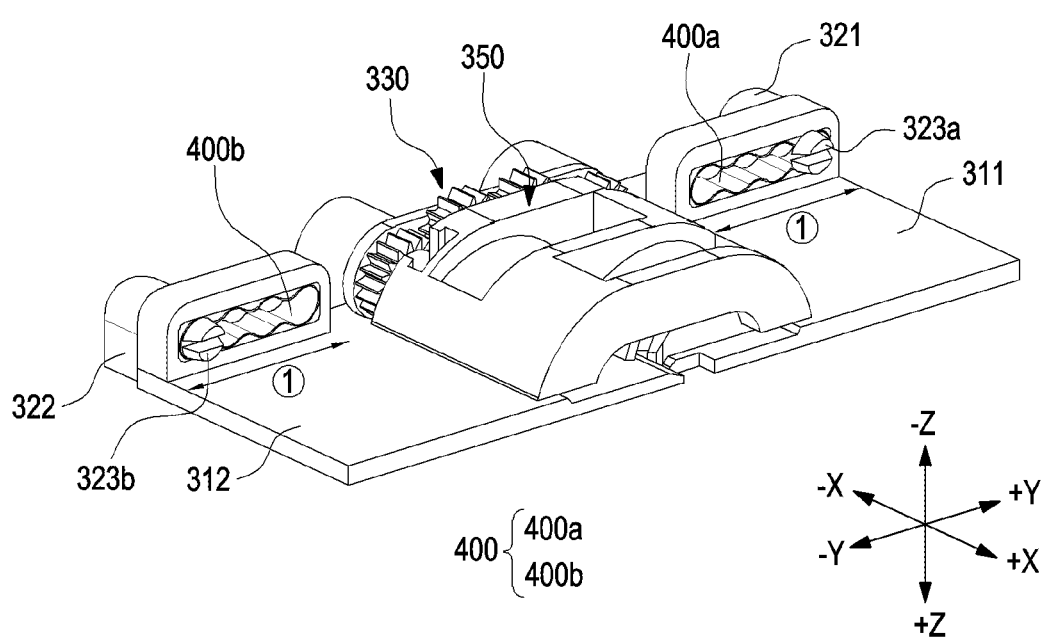
FIG. 7 is a perspective view illustrating a hinge structure and a detent member according to an embodiment of the disclosure.
Figure 8:
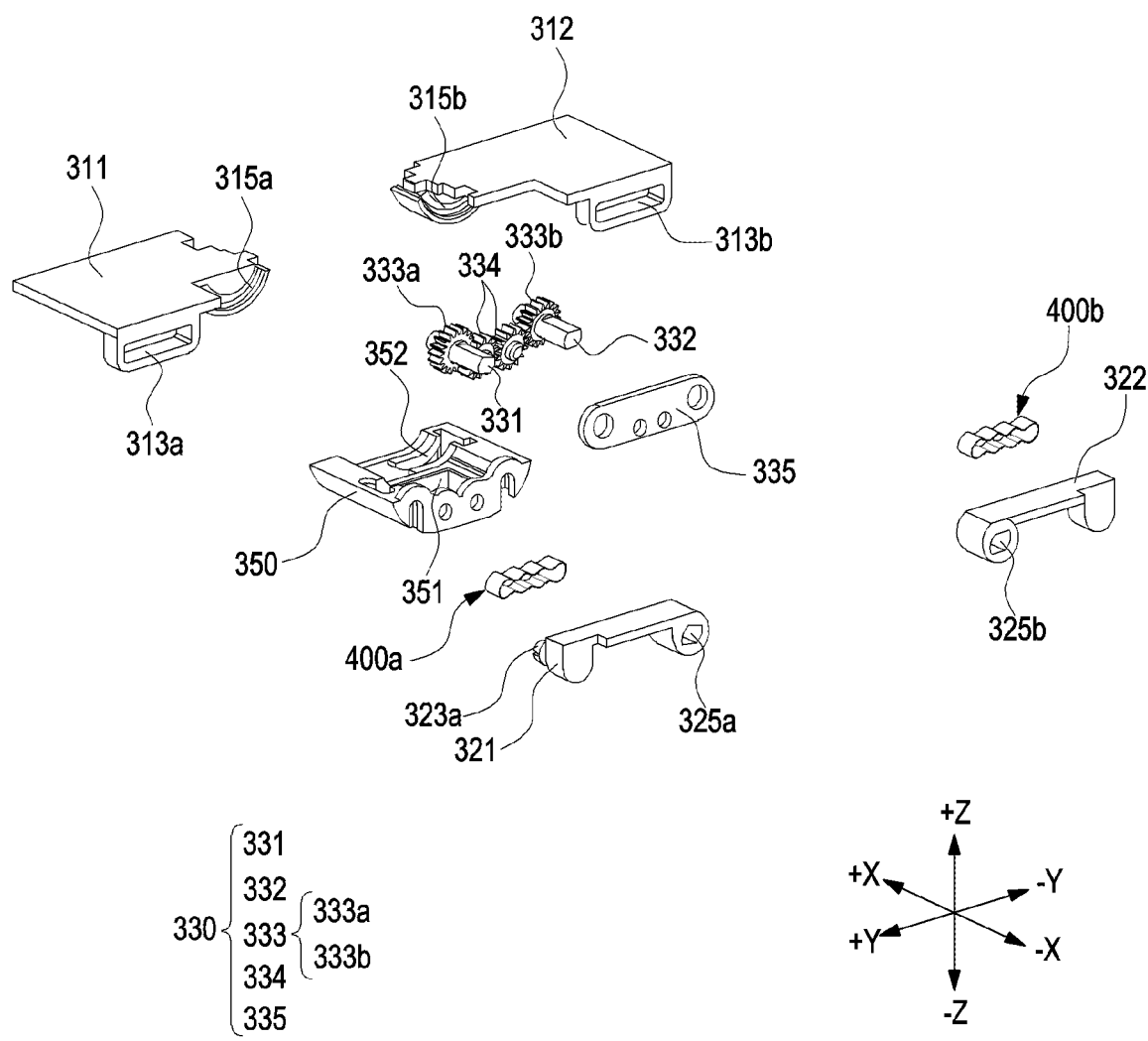
FIG. 8 is an exploded perspective view illustrating a hinge structure and a detent member according to an embodiment of the disclosure.

FIG. 5 is a diagram illustrating a rear view of a hinge structure according to an embodiment of the disclosure. FIG. 6 is a perspective view illustrating a hinge structure according to an embodiment of the disclosure. FIG. 7 is a perspective view illustrating a hinge structure and a detent member according to an embodiment of the disclosure. FIG. 8 is an exploded perspective view illustrating a hinge structure and a detent member according to an embodiment of the disclosure.

The configuration of the hinge structure of FIGS. 5, 6, 7 and 8 (which may be referred to as FIGS. 5 to 8) may be identical in whole or part to the configuration of the hinge structure 280 of FIG. 4.

In an embodiment, the hinge structure 300 may include a rotating structure 310, an interlocking structure 330, a fixing structure 320 and/or a detent member 400.

According to an embodiment, the rotating structure 310 may substantially implement or guide rotation of the first housing 210 (e.g., the first housing 210 of FIGS. 2 to 4) and/or the second housing 220 (e.g., the second housing 220 of FIGS. 2 to 4). For example, the first housing 210 may rotate about a first rotational axis Ax1, and the second housing 220 may rotate about a second rotational axis Ax2. According to an embodiment, the folding axis (e.g., the folding axis A of FIG. 1) may be interpreted as a virtual axis positioned between the first rotational axis Ax1 and the second rotational axis Ax2.

According to an embodiment, the rotating structure 310 may be connected with a first supporting member (e.g., the first supporting member 212 of FIG. 4) of the first housing 210 and a second supporting member (e.g., the second supporting member 222 of FIG. 4) of the second housing 220. According to an embodiment, the rotating structure 310 may include a first rotating member 311 (e.g., a first rotating portion) connected to the first supporting member 212 and a second rotating member 312 (e.g., a second rotating portion) connected to the second supporting member 222. According to an embodiment, the first rotating member 311 may face a first display area (e.g., the first display area 231 of FIG. 1) disposed in the first housing 210, and the second rotating member 312 may face a second display area (e.g., the second display area 232 of FIG. 1) disposed in the second housing 220.

In an embodiment, the rotating structure 310 may include a rotating bracket 350. According to an embodiment, the rotating bracket 350 may be connected to the hinge cover (e.g., the hinge cover 240 of FIG. 4). For example, the first rotating member 311 and the second rotating member 312 may be rotated about the rotating bracket 350 while being at least partially received in the rotating bracket 350. In an embodiment, the rotating bracket 350 may include guide curved surfaces 351 and 352 for guiding the rotation or pivot of the rotating members 311 and 312. In an embodiment, the guide curved surfaces 351 and 352 may include a first guide curved surface 351 and a second guide curved surface 352 spaced apart in the width direction (e.g., X-axis direction) of the hinge structure 300 or the electronic device (e.g., the electronic device 200 of FIGS. 2 to 4). For example, the guide curved surfaces 351 and 352 may include an arc-shaped outer circumferential surface. For example, the outer circumferential surface of the guide curved surface may substantially be a curved surface having an arc trajectory centered on any one of the rotational axes.

According to an embodiment, the rotating members 311 and 312 may include rolling areas 315a and 315b on surfaces facing the guide curved surfaces. According to an embodiment, the rotating member 311 or 312 or the rolling area 315a or 315b may be guided by the guide curved surface 351 or 352 and rotated about any one axis Ax1 or Ax2 of the rotational axes. According to an embodiment, the first rotating member 311 may include a first rolling area 315a guided by the first guide curved surface 351. The second rotating member 312 may include a second rolling area 315b guided by the second guide curved surface 352. For example, the rolling areas 315a and 315b may include an arc-shaped outer circumferential surface. For example, the outer circumferential surface of the rolling area may substantially be a curved surface having an arc trajectory centered on any one of the rotational axes.

According to an embodiment, the rotating members 311 and 312 may include through slots 313a and 313b for receiving pin members 323a and 323b (e.g., pin). For example, the first rotating member 311 may include a first through slot 313a connected with the first pin member 323a (e.g., a first pin), and the second rotating member 312 may include a second through slot 313b connected with the second pin member 323b (e.g., a second pin). According to an embodiment, the through slots 313a and 313b may be holes or slots penetrated in the length direction (e.g., X-axis direction) of the hinge structure 300 and extending in the width direction (e.g., Y-axis direction).

According to an embodiment, the interlocking structure 330 may interlock rotation of the first housing 210 (e.g., the first housing 210 of FIGS. 2 to 4) with rotation of the second housing 220 (e.g., the second housing 220 of FIGS. 2 to 4). According to an embodiment, the interlocking structure 330 may transfer at least a portion of the force applied to the first housing 210 to the second housing 220 or transfer at least a portion of the force applied to the second housing 220 to the first housing 210. For example, the interlocking structure 330 may rotate the second housing 220 by substantially the same angle as the angle at which the first housing 210 is rotated.

In an embodiment, the interlocking structure 330 may include gear shafts 331 and 332 and a plurality of gears 333a, 333b, and 334.

According to an embodiment, the gear shafts 331 and 332 may include a first gear shaft 331 rotatable about the first interlocking axis Ax3 and a second gear shaft 332 rotatable about the second interlocking axis Ax4. According to an embodiment, a first gear 333a may be included on the outer circumferential surface the first gear shaft 331, and a second gear 333b may be included on the outer circumferential surface of the second gear shaft 332. According to an embodiment, the first gear 333a of the first gear shaft 331 may be engaged with the second gear 333b of the second gear shaft 332, interlocking the first housing 210 and the second housing 220. For example, the force delivered from the first rotating member 311 coupled to the first housing 210 may be transferred to the first gear shaft 331 through a first arm member 321. The second gear shaft 332 engaged with the first gear shaft 331 may receive the force, rotating in a different direction from the rotating direction of the first gear shaft 331. The force delivered to the second gear shaft 332 may be transferred to the second arm member 322 and/or the second housing 220. According to an embodiment, the ends of the gear shafts 331 and 332 may be inserted to the rotating bracket 350.

According to an embodiment, the hinge structure 300 (e.g., the interlocking structure 330) may include a gear shaft supporting member 335. According to an embodiment, the gear shaft supporting member 335 may include at least one through hole for receiving the gear shafts 331 and 332 and/or an idle gear 334. For example, the gear shaft supporting member 335 may prevent or reduce escape of the gear shafts 331 and 332 and/or the idle gear 334.

In an embodiment, the fixing structure 320 may include a first arm member 321 connected with the first rotating member 311 and a second arm member 322 connected with the second rotating member 312. For example, the arm members 321 and 322, together with the gear shafts 331 and 332, may rotate about the interlocking axes Ax3 and Ax4. According to an embodiment, the first arm member 321, together with the first gear shaft 331, may rotate about the first interlocking axis Ax3. According to an embodiment, the second arm member 322, together with the second gear shaft 332, may rotate about the second interlocking axis Ax4. According to an embodiment, the arm members 321 and 322 may include through holes 325a and 325b connected with the gear shafts 331 and 332. For example, the first arm member 321 may include a first through hole 325a receiving an end of the first gear shaft 331. For example, the second arm member 322 may include a second through hole 325b receiving an end of the second gear shaft 332. For example, the rotational axes Ax1 and Ax2 may differ from the interlocking axes Ax3 and Ax4. For example, the first rotational axis Ax1, the second rotational axis Ax2, the first interlocking axis Ax3, and the second interlocking axis Ax4 may be substantially parallel to each other.

According to an embodiment, the fixing structure 320 may receive force from the rotating members 311 and 312 or transfer force to the rotating members 311 and 312 by means of at least one pin member 323a and 323b. For example, the pin members 323a and 323b may protrude from surfaces of the arm members 321 and 322 facing the rotating members 311 and 312. For example, the pin members 323a and 323b may be integrally formed with the arm members 321 and 322 or, as separate members, may be coupled to the arm members 321 and 322. For example, the pin members 323a and 323b may be slidably connected to the rotating members 311 and 312. According to an embodiment, the pin members 323a and 323b may slide in the direction of arrow ① of FIG. 7 in the through slots 313a and 313b formed in the rotating members 311 and 312. For example, the direction of arrow ① may be substantially parallel to the length direction (Y-axis direction) of the electronic device (e.g., the electronic device 200 of FIGS. 2 to 4) or the hinge structure 300. According to an embodiment, the first arm member 321 may include a first pin member 323a that is slidably connected to the first through slot 313a formed in the first rotating member 311. According to an embodiment, the second arm member 322 may include a second pin member 323b that is slidably connected to the second through slot 313b formed in the second rotating member 312. For example, as the first pin member 323a and/or the second pin member 323b slides in the through slot 313a or 313b and/or the detent slot 401 or 402 (refer, e.g., to FIGS. 9A and 9B), the difference between the rotational axis of the rotating member 311 or 312 and the interlocking axis of the interlocking structure 330 and/or the fixing structure 320 may be corrected. According to an embodiment, the pin members 323a and 323b may slide in the direction of arrow ① in the detent slots 401 and 402 of the detent member 400 disposed in the through slots 313a and 313b of the rotating members 311 and 312. For example, the extending direction of the through slot 313a or 313b and the detent slot 401 or 402 may be the same as the length direction (Y-axis direction) of the hinge structure 300 or the electronic device (e.g., the electronic device 200 of FIGS. 2 to 4). For example, that the pin members 323a and 323b slide in the through slots 313a and 313b may be interpreted as the pin members 323a and 323b sliding in the detent slots 401 and 402.

The configuration of the hinge structure 300 in the disclosure is optional. For example, at least one structure among the rotating structure 310, the interlocking structure 330, and the fixing structure 320 of the hinge structure 300 may be altered or omitted. The detent member 400 in the disclosure is not separate from the embodiment of the hinge structure 300 of the disclosure. For example, the hinge structure (e.g., 280 of FIGS. 4 and/or 300 of FIGS. 5 and 6) to which the detent member 400 of the disclosure applies may include various types of interlocking structures (e.g., the interlocking structure 330 of FIGS. 5 to 7). In an embodiment, the interlocking structure of the hinge structure to which the detent member 400 is applied may include various types of gears (e.g., spur gears, helical gears, or worm gears). In an embodiment, the interlocking structure of the hinge structure to which the detent member 400 is applied may include no gear. For example, the interlocking structure may include a spiral structure. For example, the interlocking structure may be connected in the width direction (X-axis direction) of the hinge structure 300 with respect to the rotating members 311 and 312.

In an embodiment, the hinge structure 300 may include at least one detent member 400 that provides a stopping force or fastening force to the first housing 210 and/or the second housing 220. For example, the detent member 400 may also be interpreted as a member separate from the hinge structure 300. For example, referring to FIG. 8, the detent member 400 may be a portion (e.g., the through slots 313a and 313b) of the rotating members 311 and 312. For example, the detent member 400 may be mounted to be at least partially received in the through slots 313a and 313b formed in the rotating members 311 and 312.

According to an embodiment, the detent member 400 may include an elastic material (elastic body). The detent member 400 may provide force in a specific direction in response to the elastic force generated from the elastic material, so that the user may be provided with a sense of control (e.g. feeling stuck or feeling of stopping during movement) according to the left and right movement of the pin member 323a and 323b in the detent slot (e.g., 401 and 402 of FIGS. 9A, 9B) of the detent member 400.

According to an embodiment, the detent member 400 may be formed to provide a free stop structure at a certain point when the foldable electronic device operates from an unfolded state to a folded state, or from a folded state to an unfold state. The detent member 400 may guide an operation of the electronic device from an unfolded state to a folded state, or an operation of the electronic device from a folded state to an unfolded state.

According to an embodiment, the detent member 400 may be referred to as a detent portion, an elastic member, an elastic body, a variable portion, or a deformable portion.

Referring to FIGS. 7 and 8, in an embodiment, the detent member 400 may include a first detent member 400a disposed in the first housing 210 and a second detent member 400b disposed in the second housing 220. For example, the first detent member 400a may be at least partially received in the first through slot 313a formed in the first rotating member 311. For example, the second detent member 400b may be at least partially received in the second through slot 313b formed in the second rotating member 312.

In an embodiment, the detent member 400 may include detent slots 401 and 402 connected with the pin members 323a and 323b of the arm members 321 and 322. For example, the detent slots 401 and 402 may be holes or slots that are penetrated in the width direction (X-axis direction) of the hinge structure 300 or the electronic device (e.g., the electronic device 200 of FIGS. 2 to 4) and extend in the length direction (Y-axis direction). For example, the detent slots 401 and 402 may have a predetermined thickness in the width direction (X-axis direction) of the hinge structure 300. For example, at least a portion of the first pin member 323a may be received in the first detent slot 401 formed in the first detent member 400a. At least a portion of the second pin member 323b may be received in the second detent slot 402 formed in the second detent member 400b. According to an embodiment, the detent slots 401 and 402 may be formed to surround at least a portion of the received pin members 323a and 323b. In an embodiment, the cross section in the width direction (Y-axis direction) of the pin members 323a and 323b may be circular. For example, the detent slots 401 and 402 may include curved surfaces at least partially surrounding the outer circumferential surfaces of the pin members 323a and 323b. However, the shape of the cross section in the width direction (Y-axis direction) of the pin members 323a and 323b is not limited to a circular shape. For example, the cross section in the width direction of the pin members 323a and 323b may have various shapes, such as an ellipse or polygon (rectangle or pentagon). For example, the detent member 400 or the detent slots 401 and 402 may be formed in various shapes to at least partially surround the pin members 323a and 323b.

Figure 11A:
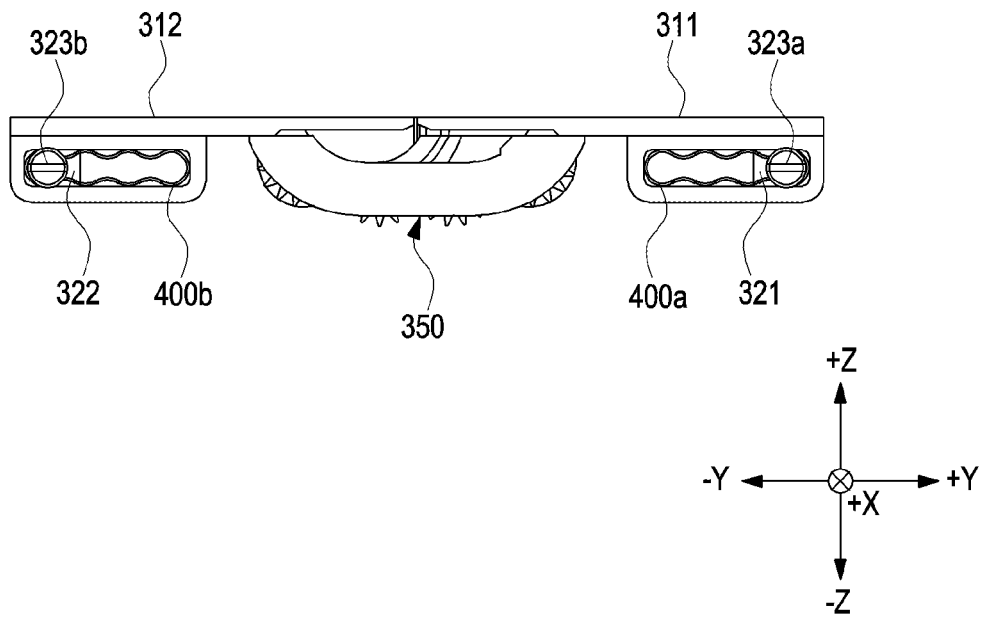
FIGS. 11A and 11B are diagrams illustrating a hinge structure and a detent member according to an embodiment of the disclosure.
Figure 11B:
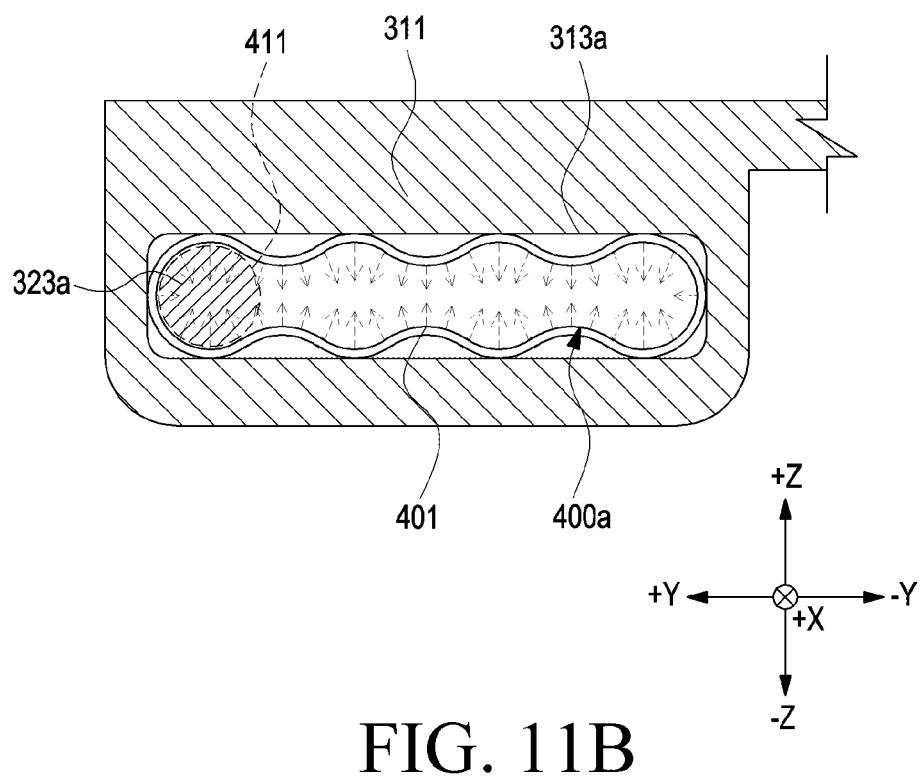

According to an embodiment, the detent member 400 may provide a force (fastening force) to the interlocking structure 330 and/or rotating structure 310, positioning the first housing 210 and the second housing 220 at a certain angle. For example, the detent member 400 may provide a force (elastic force) (e.g., as indicated by the arrow of FIG. 11B), which acts in the width direction of the pin members 323a and 323b, to the pin members 323a and 323b of the interlocking structure 330. For example, when the pin members 323a and 323b have a circular widthwise cross section, the force (elastic force) provided by the detent member 400 may act in a direction normal to the outer circumferential surface of the pin members 323a and 323b. For example, the pin members 323a and 323b of the arm members 321 and 322 may transfer the elastic force of the detent member 400 to the interlocking structure 330 and/or the rotating structure 310. For example, the elastic force of the detent member 400 may act as a force to prevent or reduce movement and/or rotation of the first housing 210 and/or the second housing 220. For example, the detent member 400 may provide a predetermined value of, or more, elastic force. For example, when the user applies a designated value of, or more, external force, the first housing 210 and/or the second housing 220 may be rotated. For example, when the external force is not applied, or an external force less than the designated value is applied, the first housing 210 and/or the second housing 220 may remain in the stopped state due to the elastic force of the detent member 400. According to an embodiment, e.g., the detent member 400 may include various materials that provide the designated value of, or more, elastic force. For example, the detent member 400 may have a yield strength that resists the external force in a value range normally provided by the user for moving and/or rotating the first housing 210 and/or the second housing 220. For example, the yield strength of the detent member 400 may be about 1000 Mpa or more. In an embodiment, the detent member 400 may include metal, e.g., nickel or chrome. For example, the detent member 400 may include austenitic stainless steel. As another example, the detent member 400 may include a spring metal such as 304 stainless steel or 301 stainless steel. However, the above-described yield strength and material of the detent member 400 are merely an example, and are not limited thereto.

Figure 12A:
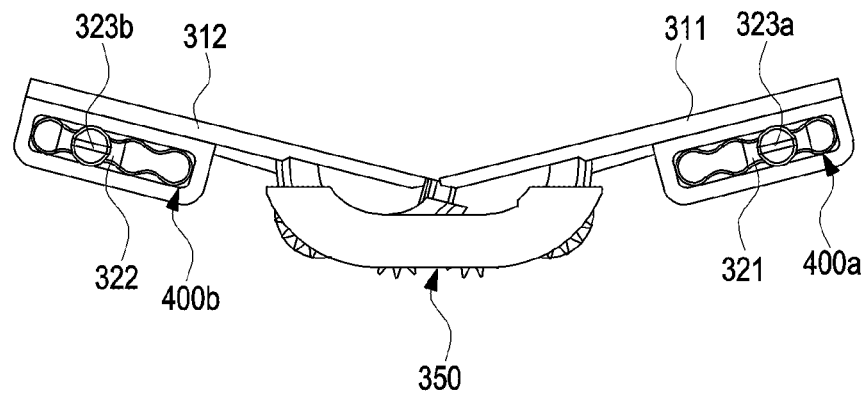
FIGS. 12A, 12B and 12C are diagrams illustrating a hinge structure and a detent member according to an embodiment of the disclosure.
Figure 12B:
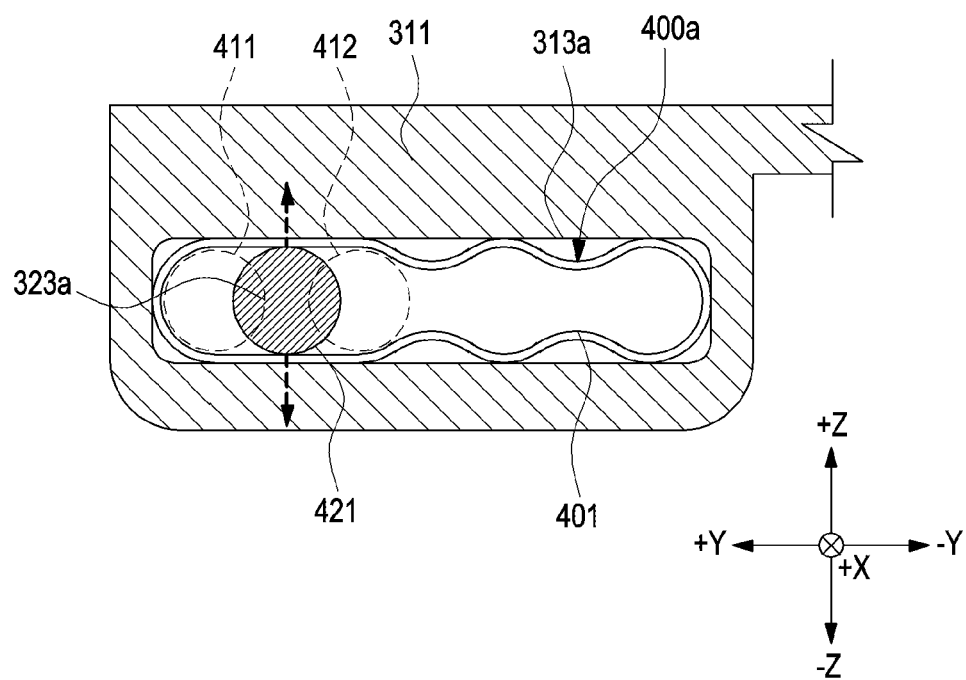
Figure 12C:
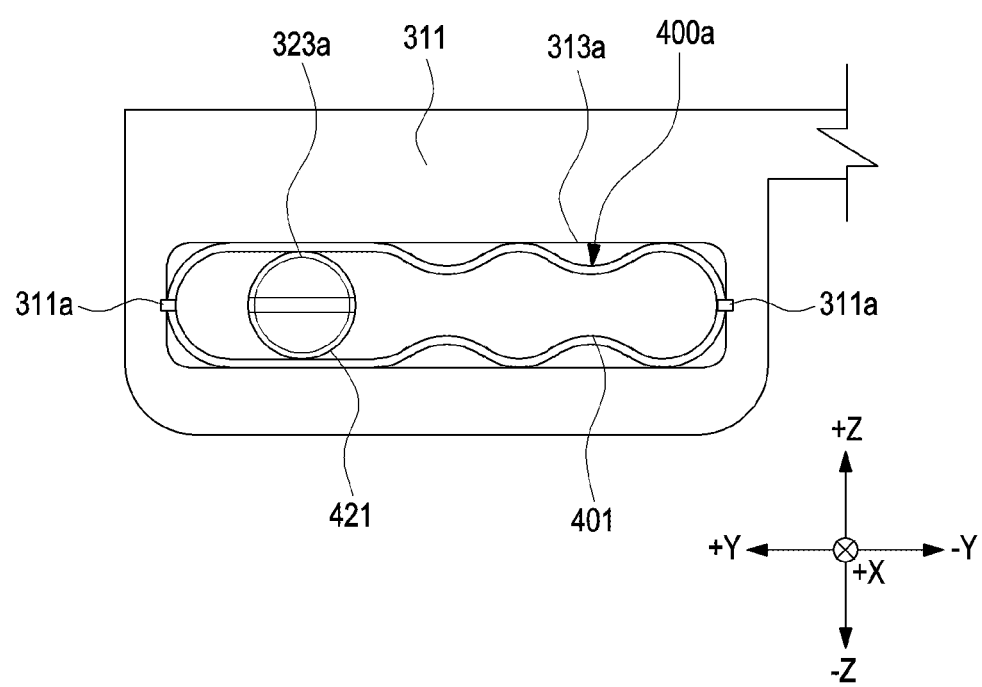

FIGS. 9A, 9B, 9C and 9D are diagrams illustrating a detent member according to an embodiment of the disclosure. FIG. 10 is a diagram illustrating a rotation of a hinge structure according to an embodiment of the disclosure. FIGS. 11A and 11B are diagrams illustrating a hinge structure and a detent member according to an embodiment of the disclosure. FIG. 11A may illustrate the appearance of the hinge structure when the electronic device (e.g., the electronic device 200 of FIGS. 2 to 4) is in the unfolded state, and FIG. 11B is a partial cross-sectional view of FIG. 11A. FIGS. 12A, 12B and 12C are diagrams illustrating a hinge structure and a detent member according to an embodiment of the disclosure. FIG. 12A may illustrate the appearance of the hinge structure when the electronic device 200 is in an intermediate state between the unfolded state and the folded state, and FIG. 12B is a partial cross-sectional view of FIG. 12A. FIG. 12C is a diagram illustrating a structure for reducing or limiting the separation of a detent member disposed in a rotating member of a hinge structure.

The configuration of the first rotating member 311 of FIGS. 10, 11A, 11B, 12A, 12B and 12C (which may be referred to as FIGS. 10 to 12C) may be identical in whole or part to the configuration of the first rotating member 311 of FIGS. 6 to 8. The configuration of the second rotating member 312, the first arm member 321, the second arm member 322, and the rotating bracket 350 of FIGS. 10, 11A, and 12A may be identical in whole or part to the configuration of the second rotating member 312, first arm member 321, second arm member 322, and rotating bracket 350 of FIGS. 6 to 8. The configuration of the first detent member 400a of FIGS. 9A to 12B may be identical in whole or part to the configuration of the first detent member 400a of FIGS. 7 and 8. The configuration of the second detent member 400b of FIGS. 9B to 11A and 12A may be identical in whole or part to the configuration of the second detent member 400b of FIGS. 7 and 8.

Referring to FIGS. 9A to 12C, according to an embodiment, the second detent member 400b may be a mirror image of the first detent member 400a with respect to the length direction (Y-axis direction) of the electronic device (e.g., the electronic device 200 of FIGS. 2 to 4) or the hinge structure 300.

Referring to FIGS. 9A to 9D, in an embodiment, the detent members 400a and 400b (e.g., the detent slots 401 and 402) may include at least one hole areas 410a and 410b where the pin members 323a and 323b are positioned. For example, the maximum height d2 of the hole areas 410a and 410b may be equal to or larger than the width of the pin members 323a and 323b. For example, the hole areas 410a and 410b may at least partially surround the pin members 323a and 323b. In an embodiment, the detent slots 401 and 402 may include a plurality of hole areas 410a and 410b spaced apart in the length direction (Y-axis direction) of the hinge structure 300. According to an embodiment, the detent slots 401 and 402 may include a plurality of connection areas 420a and 420b alternately disposed with the plurality of hole areas 410a and 410b. For example, the hole areas 410a and 410b neighboring each other may be spaced apart from each other with at least one first connection area 420a and 420b interposed therebetween. For example, the connection areas 420a and 420b may form a narrower path than the hole areas 410a and 410b. According to an embodiment, the minimum height d3 of the connection areas 420a and 420b may be smaller than the maximum height d2 of the hole areas 410a and 410b. For example, the maximum height of the connection areas 420a and 420b may be equal to or smaller than the maximum height d2 of the hole areas 410a and 410b. In an embodiment, the respective maximum heights d2 of the first hole area 410a and 410b may be substantially identical, and the respective minimum heights d3 of the connection areas 420a and 420b may be substantially identical, but are not limited thereto.

Figure 9A:
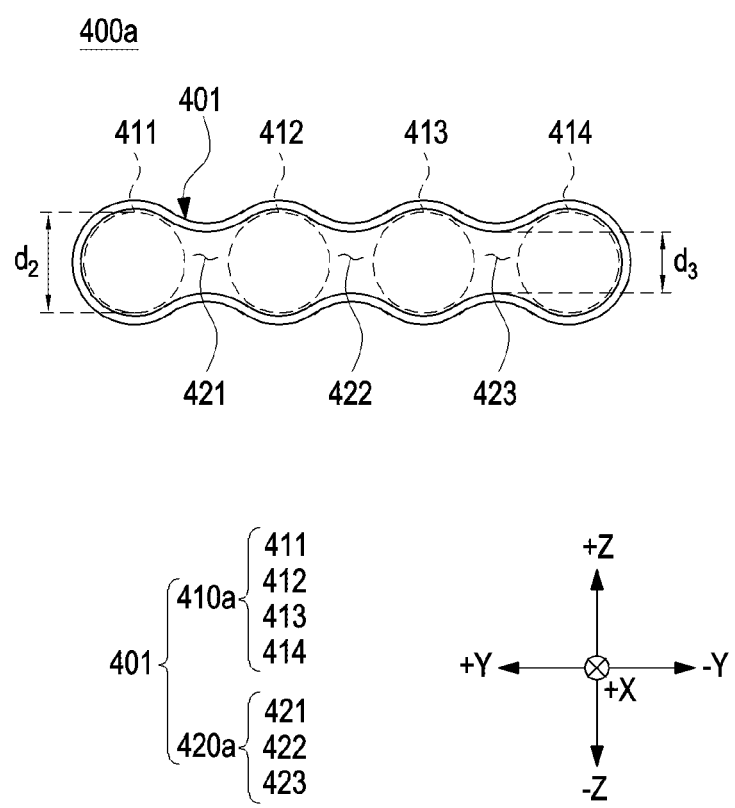
FIGS. 9A, 9B, 9C and 9D are diagrams illustrating a detent member according to an embodiment of the disclosure.
Figure 9B:
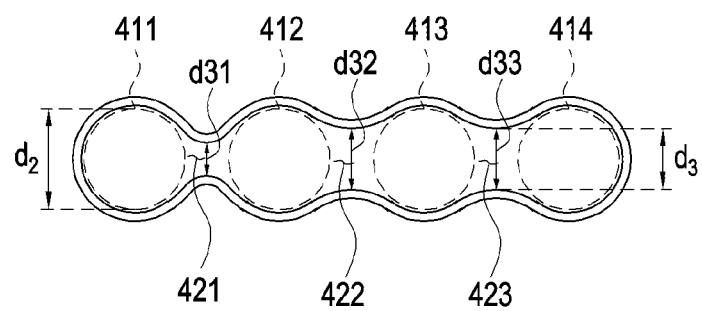
Figure 9B:
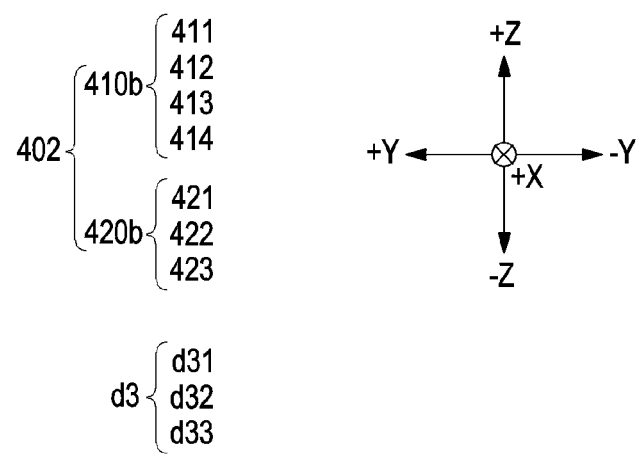
Figure 10:
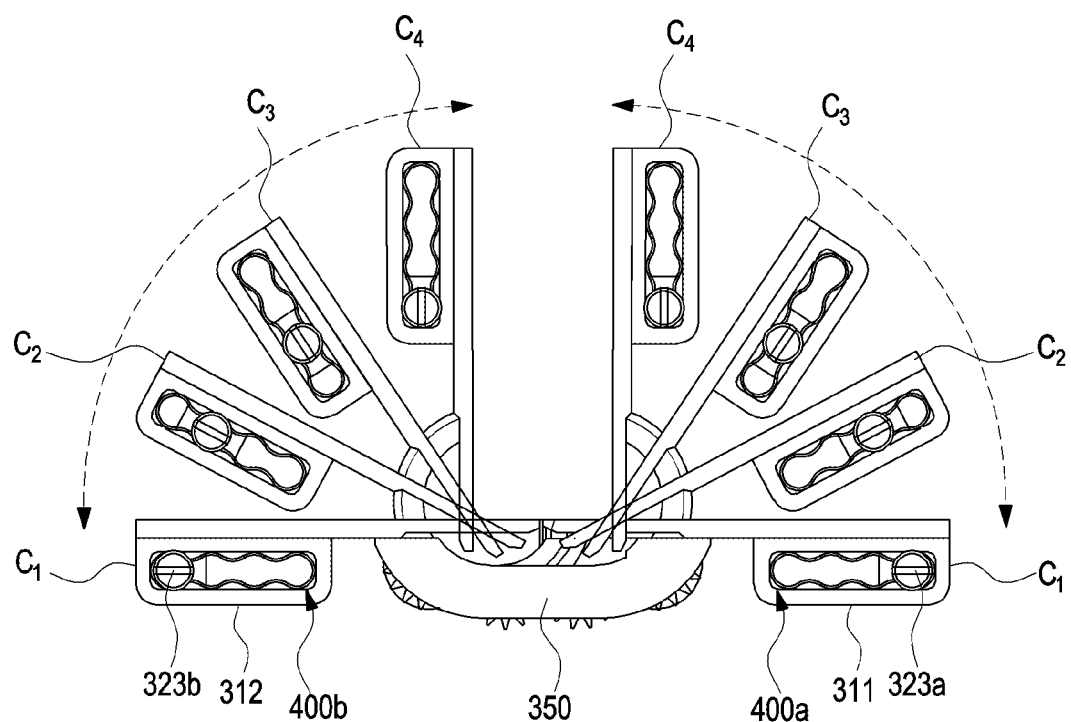
FIG. 10 is a diagram illustrating a rotation of a hinge structure according to an embodiment of the disclosure.

Referring to FIGS. 9A and 9B, in an embodiment, the first detent member 400a (e.g., the first detent slot 401) may include a 1-1th hole area 411, a 1-2th hole area 412, a 1-3th hole area 413, and a 1-4th hole area 414 spaced apart from each other. For example, the first hole area 410a may be a space for receiving the first pin member 323a. The first hole area 410a may be a space having a shape corresponding to a portion received in the first detent slot 401 of the first pin member 323a. In an embodiment, when the first pin member 323a is received in the first hole area 410a, the first detent member 400a may not be deformed due to the first pin member 323a. According to an embodiment, the first hole area 410a may be the area indicated by the dashed line of FIG. 9A.

In an embodiment, the first detent member 400a (e.g., the first detent slot 401) may include at least one first connection area 420a forming a narrower path than the first hole area 410a between neighboring hole areas 410a. In an embodiment, the first detent slot 401 may include a 1-1th connection area 421, a 1-2th connection area 422, and a 1-3th connection area 423 spaced apart from each other. For example, a 1-1th connection area 421 may connect the 1-1th hole area 411 and the 1-2th hole area 412. A 1-2th connection area 422 may connect the 1-2th hole area 412 and the 1-3th hole area 413. A 1-3th connection area 423 may connect the 1-3th hole area 413 and the 1-4th hole area 414. For example, the first hole area 410a may denote an inner space the first detent slot 401 into a cylindrical portion of the first pin member 323a may be inserted. For example, the first connection area 420a may be a space for receiving the first pin member 323a. In an embodiment, if the first pin member 323a is received in the first connection area 420a, the first detent member 400a may be deformed due to the first pin member 323a. For example, the first connection area 420a may be an inner space of the first detent slot 401 surrounded by the first detent member 400a and two hole areas 410a contacting two opposite sides of the first connection area 420a. However, the number, arrangement, and/or shape of the hole areas 410a and connection areas 420a of the first detent slot 401 is not limited thereto.

Figure 9C:
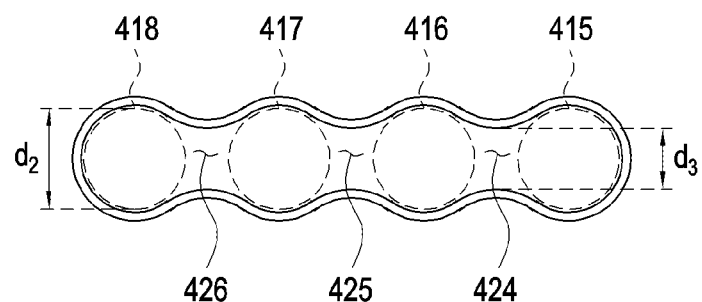
Figure 9C:
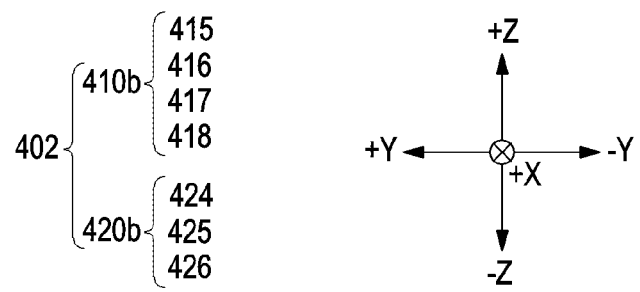
Figure 9D:
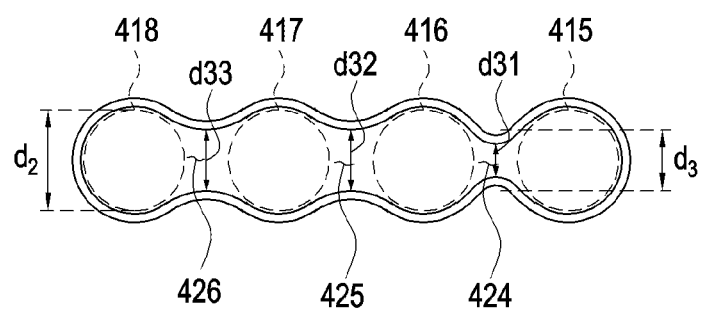
Figure 9D:
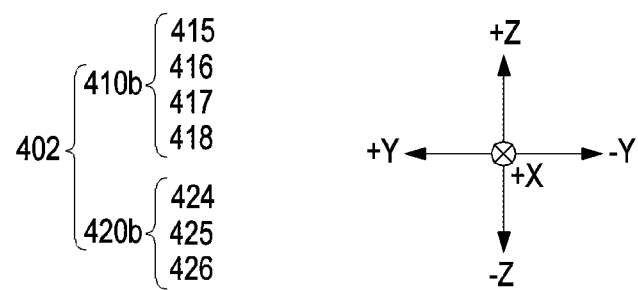

Referring to FIGS. 9C and 9D, in an embodiment, the second detent member 400b (e.g., the second detent slot 402) may include a 2-1th hole area 415, a 2-2th hole area 416, a 2-3th hole area 417, and a 2-4th hole area 418 spaced apart from each other. For example, the second hole area 410b may be a space for receiving the second pin member 323b. The second hole area 410b may be a space having a shape corresponding to a portion received in the second detent slot 402 of the second pin member 323b. In an embodiment, when the second pin member 323b is received in the second hole area 410b, the second detent member 400b may not be deformed due to the second pin member 323b. According to an embodiment, the second hole area 410b may be the area indicated by the dashed line of FIG. 9B. For example, the second hole area 410b may denote the inner space of the cylindrical second detent slot 402 corresponding to the second pin member 323b.

According to an embodiment, the second detent member 400b (e.g., the second detent slot 402) may include at least one second connection area 420b forming a narrower path than the second hole area 410b between neighboring hole areas 410b. In an embodiment, the second detent slot 402 may include a 2-1th connection area 424, a 2-2th connection area 425, and a 2-3th connection area 426 spaced apart from each other. For example, a 2-1th connection area 424 may connect the 2-1th hole area 415 and the 2-2th hole area 416. A 2-2th connection area 425 may connect the 2-2th hole area 416 and the 2-3th hole area 413. A 2-3th connection area 426 may connect the 2-3th hole area 413 and the 2-4th hole area 418. For example, the second connection area 420b may be a space for receiving the second pin member 323b. In an embodiment, if the second pin member 323b is received in the second connection area 420b, the second detent member 400b may be deformed due to the second pin member 323b. For example, it may be an inner space of the second detent slot 402 surrounded by the second detent member 400b and two hole areas 410b contacting two opposite sides thereof. However, the number, arrangement, and/or shape of the hole areas 410b and connection areas 420b of the second detent slot 402 is not limited thereto.

According to an embodiment, the 'state in which the pin members 323a and 323b are seated in the hole areas 410a and 410b' may denote a state in which the pin members 323a and 323b are positioned in the hole areas 410a and 410b without deforming the detent member 400. For example, the first pin member 323a of FIG. 11B may be in a state of being seated in the 1-1th hole area 411 of the first detent slot 401. In the state in which the pin members 323a and 323b are seated in the hole areas 410a and 410b, the pin members 323a and 323b may not be positioned in the connection areas 420a and 420b. According to an embodiment, the 'state in which the pin members 323a and 323b are positioned in the connection areas 420a and 420b' may denote a state in which at least a portion of the pin members 323a and 323b is held in the connection areas 420a and 420b. For example, the first pin member 323a shown in FIG. 12B may be in a positioned state in the 1-1th connection area 421 of the first detent slot 401. According to an embodiment, in the state in which the pin members 323a and 323b are positioned in the connection areas 420a and 420b, at least a portion of the connection areas 420a and 420b may be deformed by the pin members 323a and 323b. For example, in the state in which the pin members 323a and 323b are positioned in the connection areas 420a and 420b, at least a portion of the pin members 323a and 323b may also be positioned in the connection areas 420a and 420b. According to an embodiment, the pin members 323a and 323b may switch between the state of being seated in the hole areas 410a and 410b and the state of being positioned in the connection areas 420a and 420b based on rotation of the first housing 210 (e.g., the first housing 210 of FIGS. 2 to 4) and/or the second housing 220 (e.g., the second housing 220 of FIGS. 2 to 4).

Referring to FIG. 10, in an embodiment, the state in which the pin member 323a and 323b is seated in any one of the hole areas 410a and 410b may correspond to a state in which the angle (open angle) between the first housing 210 and the second housing 220 is a specific angle. According to an embodiment, the fastening force of the first housing 210 and/or the second housing 220 may be strengthened at the specific open angle corresponding to each first hole area 410a and 410b, as compared with other angles. For example, the number of specific angles may be substantially the same as the number of hole areas 410a or 410b.

FIG. 10 illustrates states C1 to C4 of the hinge structure 300 forming the specific open angle. For example, in state C1 of the hinge structure 300 shown in FIG. 10, the angle (open angle) between the first housing 210 and the second housing 220 may be a first designated angle x1. According to an embodiment, in state C1 of the hinge structure 300, the first pin member 323a may be seated in the 1-1th hole area 411, and the second pin member 323b may be seated in the 2-1th hole area 415. According to an embodiment, in state C2 of the hinge structure 300 shown in FIG. 10, the open angle may be a second designated angle x2. In an embodiment, in state C1 of the hinge structure 300, the electronic device (e.g., the electronic device 200 of FIGS. 2 to 4) may be in the unfolded state, and the first designated angle may be about 180 degrees. According to an embodiment, in state C2 of the hinge structure 300, the first pin member 323a may be seated in the 1-2th hole area 412, and the second pin member 323b may be seated in the 2-2th hole area 416. For example, the second designated angle x2 may be smaller than the first designated angle x1. In an embodiment, the second designated angle may be about 120 degrees. According to an embodiment, in state C3 of the hinge structure 300 shown in FIG. 10, the open angle may be a third designated angle x3. According to an embodiment, in state C3 of the hinge structure 300, the first pin member 323a may be seated in the 1-3th hole area 413, and the second pin member 323b may be seated in the 2-3th hole area 413. For example, the third designated angle x3 may be smaller than the second designated angle x2. In an embodiment, the second designated angle may be about 120 degrees. In an embodiment, the third designated angle may be about 60 degrees. According to an embodiment, in state C4 of the hinge structure 300 shown in FIG. 10, the open angle may be a fourth designated angle x4. According to an embodiment, in state C4 of the hinge structure 300, the first pin member 323a may be seated in the fourth hole area 413, and the second pin member 323b may be seated in the 2-4th hole area 418. For example, the fourth designated angle x4 may be smaller than the third designated angle x3. In an embodiment, in state C4 of the hinge structure 300, the electronic device (e.g., the electronic device 200 of FIGS. 2 to 4) may be in the closed state, and the fourth designated angle may be about 0 degrees.

In an embodiment, if the interval of the hole areas 410a and 410b is changed, the open angle at which the fastening force of the first housing 210 and/or the second housing 220 is strengthened may be varied. For example, the interval of hole areas 410a and 410b may be the distance between the centers of neighboring hole areas 410a and 410b. Referring to FIGS. 9A to 9D, in an embodiment, the interval between the 1-1th hole area 411 or 415 and the 1-2th hole area 412 or 416 of the detent slot 401 or 402 may be L1. For example, the interval between the 1-2th hole area 412 or 416 and the 1-3th hole area 413 or 417 of the detent slot 401 or 402 may be L2. For example, the interval between the 1-3th hole area 413 or 417 and the fourth hole area 413 or 418 of the detent slot 401 or 402 may be L3. According to an embodiment, L1, L2, and L3 may be substantially the same. For example, when the first designated angle x1 is about 180 degrees, the second designated angle x2 is about 120 degrees, the third designated angle x3 is about 60 degrees, and the fourth designated angle x4 is 0 degrees, L1, L2, and L3 may be substantially the same. However, the designated angle between the first housing 210 and the second housing 220 is not limited to those described above. For example, the designated angles may be set or varied considering the open angle that is more frequently used by the user in practice. For example, the designated angles x1, x2, x3, and x3 may be varied by adjusting the interval (e.g., L1, L2, or L3) of the hole areas 410a and 410b.

Referring to FIGS. 11A, 11B, 12A and 12B, in an embodiment, the pin members 323a and 323b may slide along the detent slots 401 and 402 by external force or rotation of the first housing 210 and/or the second housing 220. For example, in the unfolded state of the electronic device 200 shown in FIG. 11A, the first pin member 323a may be seated in the 1-1th hole area 411 as shown in FIG. 11B. Similarly, the second pin member 323b may be seated in, e.g., the 2-1th hole area 415. For example, if the first housing 210 and/or second housing 220 of the electronic device 200 in the unfolded state is rotated, the pin members 323a and 323b may be switched from the state seated in the first hole areas 411 and 415 to the state positioned in the first connection areas 421 and 424.

In an embodiment, the detent member 400 may provide a first designated value of, or more, force (elastic force) to the pin members 323a and 323b. According to an embodiment, when the external force to rotate the first housing 210 and/or the second housing 220 is larger than a first designated value, the pin members 323a and 323b may be switched from the state seated in the hole areas 410a and 410b to the state positioned in the connection areas 420a and 420b.

According to an embodiment, the magnitude of the elastic force provided by the detent member 400 to the pin members 323a and 323b in the state being positioned in the connection areas 420a and 420b may be larger than the first designated value. For example, in the state being positioned in the connection areas 420a and 420b, the pin members 323a and 323b may elastically deform at least a portion of the connection areas 420a and 420b. For example, the pin members 323a and 323b may pressurize in the direction (e.g., the direction indicated by the arrow of FIG. 12B) perpendicular to the surfaces of the contacting connection areas 420a and 420b. Referring to FIG. 12B, the first pin member 323a may pressurize a portion of the 1-1th connection area 421 in the state spanning the 1-1th connection area 421 to elastically deform it. For example, the height of the deformed portions of the connection areas 420a and 420b may be substantially the same as the width d1 of the pin members 323a and 323b. According to an embodiment, the pin members 323a and 323b may move in the extending direction (e.g., Y-axis direction) of the detent slit in the state positioned in the connection areas 420a and 420b due to the external force larger than the first designated value. For example, the pin members 323a and 323b may be switched from the state spanning the connection areas 420a and 420b to the state seated in the hole areas 410a and 410b. The portions of the connection areas 420a and 420b, which have been deformed due to the pin members 323a and 323b, may be restored to the original shapes. For example, the pin members 323a and 323b may be switched from the state being positioned in the connection areas 420a and 420b to the state seated in the hole areas 410a and 410b due to the external force to rotate the first housing 210 and/or second housing 220, which is smaller than the first designated value. According to an embodiment, when the pin members 323a and 323b slide along the guide slots, the external force required to switch from the state seated in the hole areas 410a and 410b to the state spanning the connection areas 420a and 420b may be greatest. Accordingly, when the pin members 323a and 323b are in the state seated in the hole areas 410a and 410b, the fastening force of the open angle or stopped state of the first housing 210 and/or second housing 220 may be maximized.

Referring to FIGS. 9B, and 9D, the detent members 400a and 400b (e.g., the detent slots 401 and 402) may include a plurality of connection areas 420a and 420b, and the minimum heights d3 of at least some connection areas 420a and 420b may differ.

For example, if the minimum height (e.g., d31) of a specific first connection area (e.g., the 1-1th connection area 421 and the 2-3th connection area 426) is reduced compared to the minimum height (e.g., d32 and d33) of another connection region, the minimum force required to elastically deform the first connection area 420a or 420b by the pin member 323a or 323b may increase. For example, the magnitude of the external force required to switch from the state in which the pin member 323a or 323b is seated in at least one first hole area 410a or 410b contacting the specific first connection area 420a or 420b to the state in which the pin member 323a or 323b are positioned in the specific first connection area 420a or 420b may increase. For example, the magnitude of the elastic force provided by the detent member 400 to the pin member 323a or 323b in the state in which the pin member 323a or 323b are positioned in the specific first connection area 420a or 420b may increase. Thus, in the state in which the pin member 323a or 323b is seated in the first hole area 410a or 410b contacting the specific first connection area 420a or 420b, the fastening force of the first housing 210 and/or second housing 220 may further be strengthened. According to an embodiment, the state in which the pin member 323a or 323b is seated in the 1-1th hole area 411 or 415 may correspond to a state (the unfolded state of the electronic device 200) in which the open angle is about 180 degrees (e.g., C1 of FIG. 10). In this case, if the minimum height d3 of the 1-1th connection area 421 of the first detent slot 401 reduces, the minimum force required to switch from the state the first pin member 323a is seated in the 1-1th hole area 411 of the first detent slot 401 to the state being positioned in the 1-1th connection area 421 may increase. Similarly, if the minimum height d3 of the 2-1th connection area 424 of the second detent slot 402 reduces, the minimum force required to switch from the state the second pin member 323b is seated in the 2-1th hole area 415 of the second detent slot 402 to the state being positioned in the 2-1th connection area 424 may increase. Thus, the fastening force of the first housing 210 and/or second housing 220 to maintain the state (the unfolded state of the electronic device 200) in which the open angle is about 180 degrees may be strengthened.

In the electronic device 200, the first detent member 400a is disposed in the first through slot 313a of the first rotating member 311, and according to a change in the state of the electronic device 200 changes (e.g., from an unfolded state to a folded state and/or from a folded state to a unfolded state), the first pin member 323a may slide while changing the shape of the first detent member 400 within the first detent member 400.

When the first pin member 323a repeatedly slides, as the shape of the first detent member 400 continuously changes within the first through slot 313a, the first detent member 400 may be separated from the first through slot 313a. Accordingly, the electronic device may require a structure for preventing (e.g., reducing or limiting) the first detent member 400 from being separated.

Referring to FIG. 12C, the electronic device 200 may include a structure for preventing (e.g., reducing or limiting) the first detent member 400a disposed in the first through slot 313a of the first rotation member 311 from escaping to the outside of the first through slot 313a. The first rotating member 311 may include at least one separation preventing member 311a on one side of the first through slot 313a. The separation preventing member 311a is for limiting or reducing the movement of the first detent member 400a in the longitudinal direction (e.g., the X-axis direction) of the hinge structure 300, The separation preventing member 311a has a shape extending from the first rotational member 311 through the first through slot 313a in a direction perpendicular to the X-axis direction, so that at least a portion thereof overlaps the first detent member 400a. According to an embodiment, the separation preventing member 311a may be formed in plurality to limit the separation of the first detent member 400a from the first through slots 313a and 313b. For example, the separation prevention member 311a is formed of a plurality of pieces extending in the +Y-axis direction and the −Y-axis direction of the first rotating member 311, at least a portion of each may be disposed to overlap both ends of the first detent member 400a. As another example, the separation prevention member 311a is formed of a plurality of pieces extending in the +X-axis direction and the −X-axis direction of the first rotation member 311, at least a portion of each may be disposed to overlap both ends of the first detent member 400a. The s separation preventing member 311a may be manufactured in a stepped shape. However, the number and arrangement of the separation preventing member 311a can be modified in various ways to limit the movement of the first detent member 400a without interfering with the sliding movement of the first pin member 323a According to an embodiment, the electronic device 200 may provide a structure for preventing the first detent member 400a disposed in the first through slot 313ab of the first rotation member 311 from escaping to the outside of the first through slot 313a. An adhesive member may be disposed between a portion of an outer surface of the first detent member 400a and an inner surface of the first rotation member 311 forming the first through slot 313a. The location where the adhesive member is disposed may be limited to an area where the first detent member 400a is not variable. For example, the adhesive member may be attached to an outer surface of the first detent member 400a facing the +Y direction and/or the −Y axis direction.

According to one embodiment, the structure for preventing the separation of the first detent member 400b has been described in relation to the first detent member 400a disposed in the first rotational member 311, but the structure may be provided identically or similarly to the second detent member 400b disposed in the second through slot 313b of the second rotational member 312.

Figure 13:
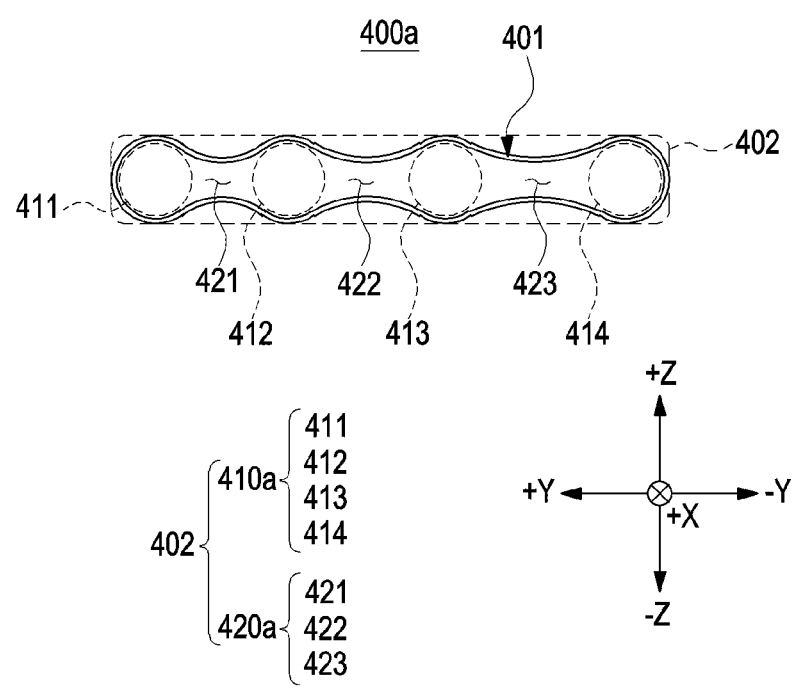
FIG. 13 is a diagram illustrating a first detent member according to an embodiment of the disclosure.

FIG. 13 is a diagram illustrating a first detent member according to an embodiment of the disclosure. The configuration of the first detent member 400a of FIG. 13 may be identical in whole or part to the configuration of the first detent member 400a of FIGS. 10A to 12B. For example, the embodiment shown in FIG. 13 may be combined with the embodiment of FIGS. 5 to 12B and/or the embodiment of FIGS. 14 to 17.

In an embodiment, the detent slots 401 and 402 (e.g., the detent slot 401 and/or 402 of FIGS. 5 to 9B) of the detent member 400 may include a plurality of hole areas (e.g., the hole areas 410a and 410b of FIGS. 9A and 9B), and the intervals of at least some hole areas 410a and 410b may differ. For example, the interval of hole areas 410a and 410b may be the distance between the centers of neighboring hole areas 410a and 410b. The interval between the 1-1th hole area 411 and the 1-2th hole area 412 of the first detent slot 401 may be L1. For example, the interval between the 1-2th hole area 412 and the 1-3th hole area 413 of the first detent slot 401 may be L2. For example, the interval between the 1-3th hole area 413 and the fourth hole area 413 of the first detent slot 401 may be L3. In an embodiment, the state in which the open angle is about 180 degrees (e.g., C1 in FIG. 10) may correspond to a state in which the first pin member 323a is seated in the 1-1th hole area 411. The state in which the open angle is 0 degrees (e.g., C4 in FIG. 10) may correspond to a state in which the first pin member 323a is seated in the 1-4th hole area 414. In this case, when the ratio of L1, L2, and L3 is 1:1:1, the open angles corresponding to the state in which the pin members 323a and 323b are seated in the 1-2th hole area 412 and the 1-3th hole area 413 may be about 120 degrees and about 60 degrees, respectively. In an embodiment, the open angle corresponding to the state in which the pin members 323a and 323b are seated in the 1-2th hole area 412 and the 1-3th hole area 413 may be increased by increasing the ratio of L3 to L1 and/or L2. For example, at least one of the open angles corresponding to the 1-2th hole area 412 and the 1-3th hole area 413 may be an open angle between about 90 degrees and about 180 degrees which is frequently used by the user in practice. For example, L1 may be a1 times L3, and L2 may be a2 times L3. For example, a1 may be larger than 0 and smaller than about 1, and a2 may be larger than 0 and smaller than about 1. For example, when L1:L2:L3 is about 0.7:0.7:1, the open angles corresponding to the 1-2th hole area 412 and the 1-3th hole area 413 may be about 128 degrees and about 75 degrees, respectively. In an embodiment, the sum of a1 and a2 may be about 1 or less. For example, when L1:L2:L3 is about 0.5:0.5:1, the open angles corresponding to the 1-2th hole area 412 and the 1-3th hole area 413 may be about 135 degrees and about 90 degrees, respectively. For example, when L1:L2:L3 is about 0.4:0.4:1, the open angles corresponding to the 1-2th hole area 412 and the 1-3th hole area 413 may be about 140 degrees and about 100 degrees, respectively. The above-described ratio of L1, L2 and/or L3 is merely an example, and the ratio may be set and changed depending on how to use the electronic device.

For example, it is possible to enhance the usability of the foldable electronic device by distributing more open angles at which the fastening force of the first housing 210 and/or second housing 220 has been strengthened in the range between about 90 degrees and about 180 degrees which are frequently used by the user in practice. The description of the first detent member 400*a* made with reference to FIG. 13 may be wholly or partially applied to the second detent member 400*b*. For example, the second detent member 400*b* may be a mirror image of the first detent member 400*a* with respect to the width direction (X-axis direction) of the electronic device (e.g., the electronic device 200 of FIGS. 2 to 4) or the hinge structure 300 (e.g., the hinge structure 300 of FIGS. 5 to 8).

Figure 14:
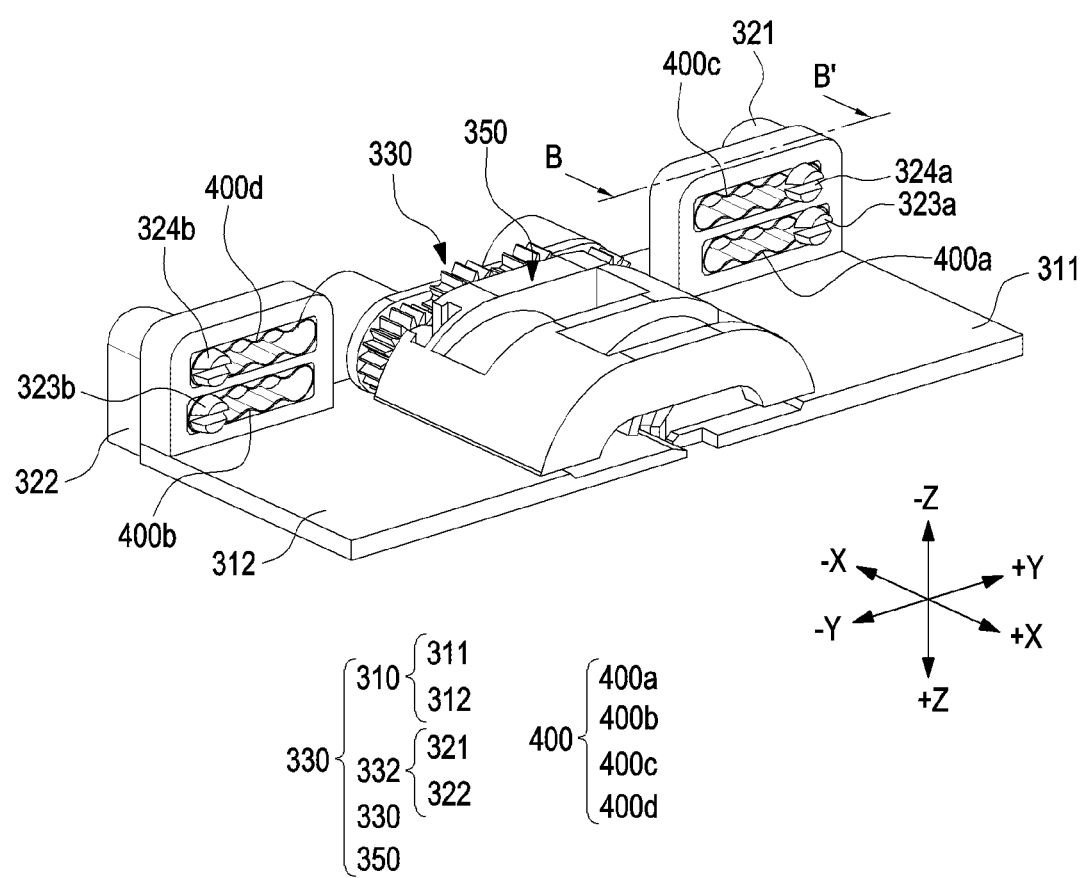
FIG. 14 is a perspective view illustrating a hinge structure and a detent member according to an embodiment of the disclosure.
Figure 15:
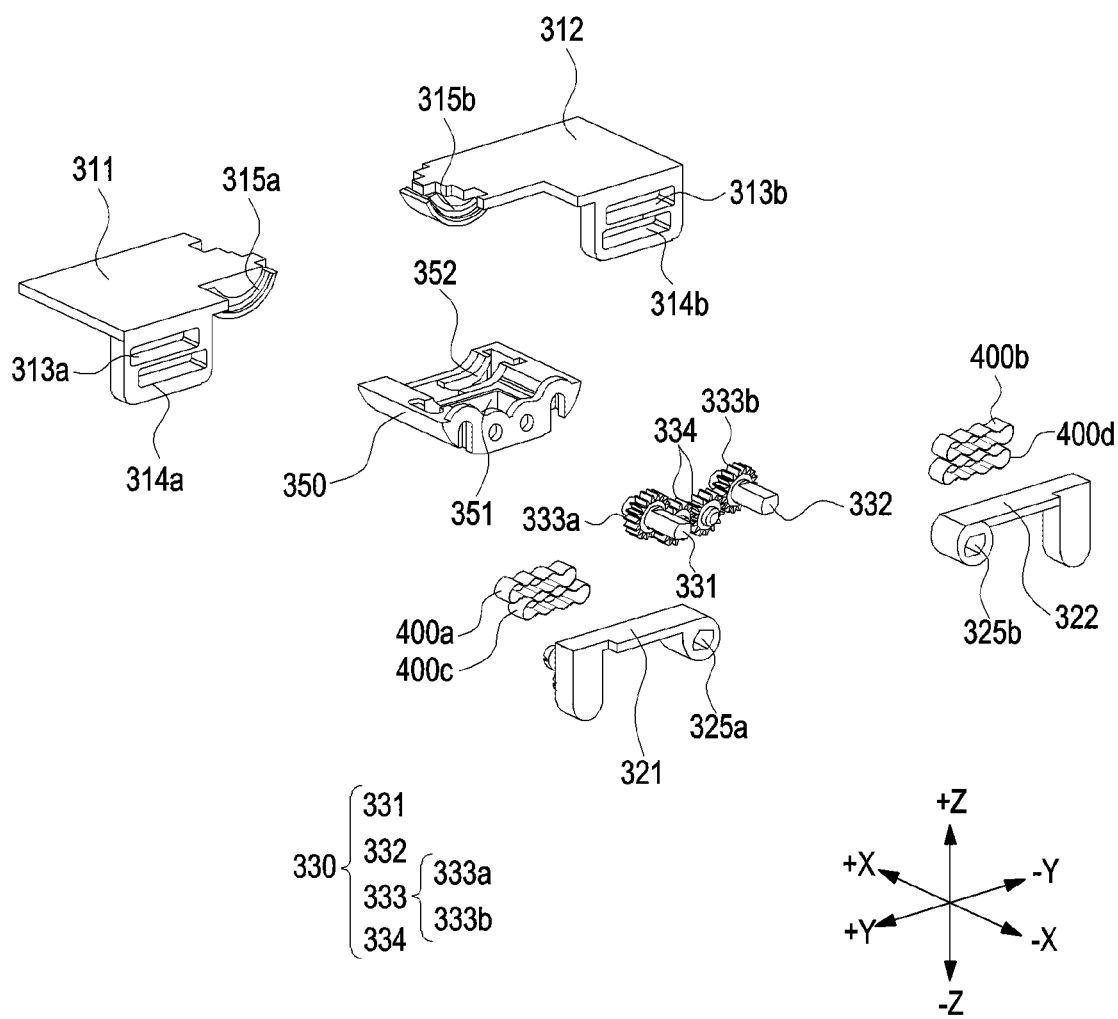
FIG. 15 is an exploded perspective view illustrating a hinge structure and a detent member according to an embodiment of the disclosure.
Figure 16:
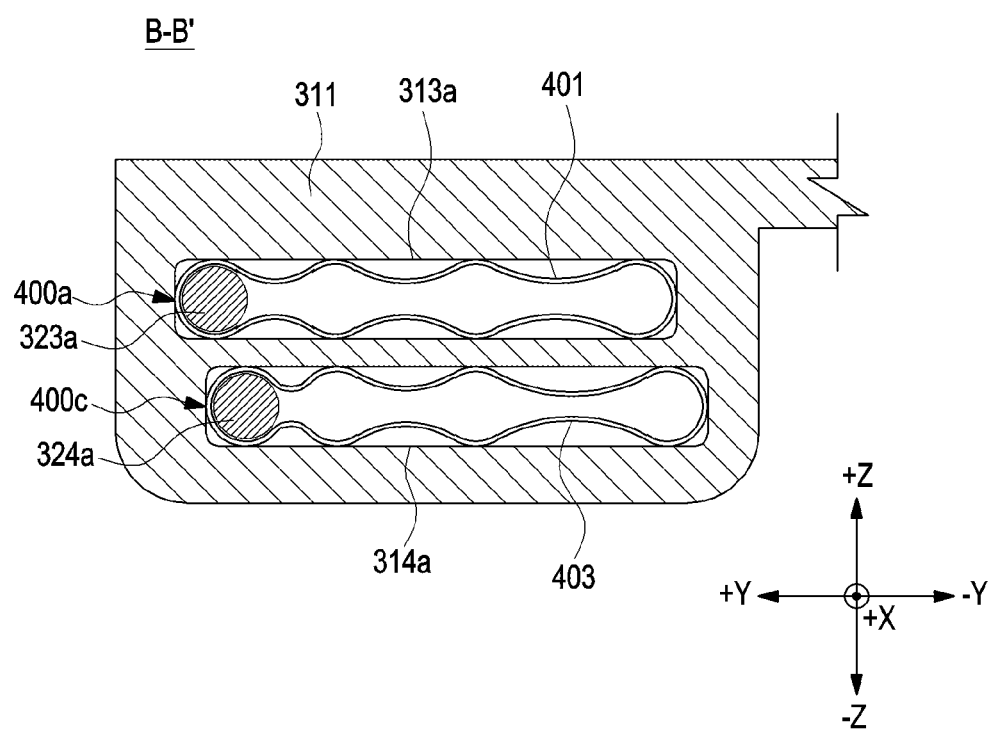
FIG. 16 is a cross-sectional view taken along line B-B' of FIG. 16, according to an embodiment of the disclosure.
Figure 17:
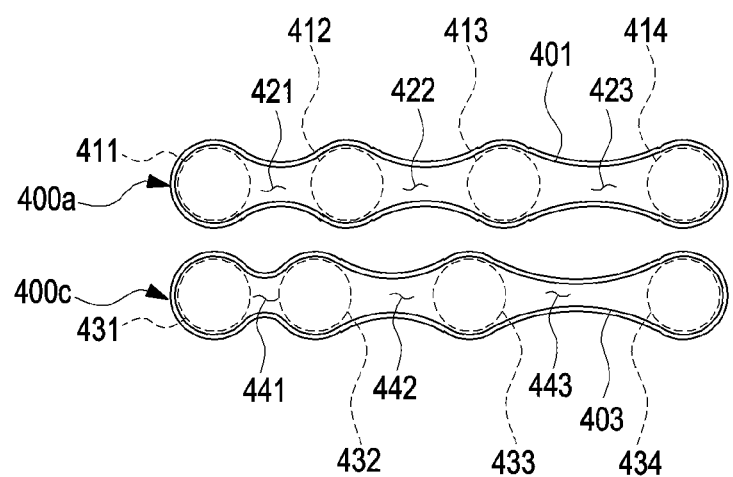
FIG. 17 is a diagram illustrating a detent member according to an embodiment of the disclosure.

FIG. 14 is a perspective view illustrating a hinge structure and a detent member according to an embodiment of the disclosure. FIG. 15 is an exploded perspective view illustrating a hinge structure and a detent member according to an embodiment of the disclosure. FIG. 16 is a cross-sectional view taken along line B-B' of FIG. 16, according to an embodiment of the disclosure. FIG. 17 is a diagram illustrating a detent member according to an embodiment of the disclosure.

The configuration of the rotating structure 310, interlocking structure 330, and fixing structure 320 of FIGS. 14 and 15 may be identical in whole or part to the configuration of the rotating structure 310, interlocking structure 330, and fixing structure 320 of FIGS. 5 to 12B. The configuration of the first detent member 400*a* of FIGS. 14 to 17 may be identical in whole or part to the configuration of the first detent member 400*a* of FIGS. 7 to 9A and 10A to 12B and/or the first detent member 400*a* of FIG. 13. The configuration of the second detent member 400*b* of FIGS. 14 and 15 may be identical in whole or part to the configuration of the second detent member 400*b* of FIG. 7, 8, 9B or 11A and 12A and/or the first detent member 400*a* of FIG. 13. For example, the rotating members 311 and 312 of FIGS. 14 and 15 may have a different number and arrangement of through slots from the rotating members 311 and 312 of FIGS. 5 to 8, 10, 11A, and 12A. For example, the arm members 321 and 322 of FIGS. 14 and 15 may have a different number and arrangement of pin members from the arm members 321 and 322 of FIGS. 5 to 8, 10, 11A and 12A.

The description of the first detent member 400*a* made with respect to FIGS. 9A and/or 13 may be wholly applied to the first detent member 400*a* of FIGS. 15 to 17 and be at least partially applied to the third detent member 400*c*.

Referring to FIGS. 14 to 16, in an embodiment, the detent member 400 may include a plurality of detent members 400 disposed in each of the first housing 210 (e.g., the first housing 210 of FIGS. 2 to 4) and the second housing 220 (e.g., the second housing 220 of FIGS. 2 to 4). For example, the detent member 400 may include a first detent member 400*a* and a third detent member 400*c* disposed in the first housing 210 and a second detent member 400*b* and a fourth detent member 400*d* disposed in the second housing 220. For example, the second detent member 400*b* and the fourth detent member 400*d*, respectively, may be mirror images of the first detent member 400*a* and the third detent member 400*c* with respect to the width direction (X-axis direction) of the electronic device (e.g., the electronic device 200 of FIGS. 2 to 4) or the hinge structure (e.g., the hinge structure 300 of FIGS. 5 to 8)

According to an embodiment, the first rotating member 311 and the second rotating member 312, respectively, may include a plurality of through slots 313*a* and 313*b*. According to an embodiment, the first rotating member 311 may include a first through slot 313*a* and a third through slot 314*a* spaced apart in the height direction (Z-axis direction) of the electronic device 200 or the hinge structure 300 (e.g., the hinge structure 300 of FIG. 5 or 14). According to an embodiment, at least a portion of the third through slot 314*a* may not overlap the first through slot 313*a* when viewed in the height direction (Z-axis direction) of the hinge structure 300. For example, the third through slot 314*a* may be spaced apart from the first through slot 313*a* in the length direction (Y-axis direction) of the hinge structure 300. For example, the spacing between the first through slot 313*a* and the third through slot 314*a* in the length direction (Y-axis direction) of the hinge structure 300 may correct the difference in distance for the display (e.g., the display 230 of FIGS. 2 to 4) and/or the spacing between the first through slot 313*a* and the third through slot 314*a* in the height direction (Z-axis direction). For example, the third detent member 400*c* may be at least partially received in the third detent slot 403. According to an embodiment, the second rotating member 312 may include the second through slot 313*b* and fourth through slot 314*b* spaced apart in the height direction (Z-axis direction) of the hinge structure 300. According to an embodiment, at least a portion of the fourth through slot 314*b* may not overlap the second through slot 313*b* when viewed in the height direction (Z-axis direction) of the hinge structure 300. For example, the fourth through slot 314*b* may be spaced apart from the second through slot 313*b* in the length direction (Y-axis direction) of the hinge structure 300. For example, the spacing between the second through slot 313*b* and the fourth through slot 314*b* in the length direction (Y-axis direction) of the hinge structure 300 may correct the difference in distance for the display (e.g., display 230 of FIGS. 2 to 4) and/or the spacing between the second through slot 313*b* and the fourth through slot 314*b* in the height direction (Z-axis direction). For example, the fourth detent member 400*d* may be at least partially received in the fourth detent slot (not shown).

Referring to FIGS. 14 to 16, in an embodiment, the arm members 321 and 322 may include a plurality of pin members 323*a*, 323*b*, 324*a* and 324*b* connected to the plurality of detent members 400*a*, 400*b*, 400*c* and 400*d*. In an embodiment, the first arm member 321 may include a first pin member 323*a* at least partially received in the first detent slot 401 and a third pin member 324*a* at least partially received in the third detent slot 403. For example, the third pin member 324*a* may be spaced apart from the first pin member 323*a* in the height direction (Z-axis direction) of the hinge structure 300. For example, the third pin member 324*a* may be spaced apart from the first pin member 323*a* in the length direction (Y-axis direction) of the hinge structure 300. For example, each of the spacings between the first pin member 323*a* and the third pin member 324*a* in the length direction (Y-axis direction) and/or the height direction (Z-axis direction) of the hinge structure 300 may be substantially the same as the spacing between the first detent member 400a and the third detent member 400c in the length direction (Y-axis direction) and/or height direction (Z-axis direction) of the hinge structure 300.

In an embodiment, the second arm member 322 may include a second pin member 323b at least partially received in the second detent slot 402 and a fourth pin member 324b at least partially received in the fourth detent slot (not shown). For example, the fourth pin member 324b may be spaced apart from the second pin member 323b in the height direction (Z-axis direction) of the hinge structure 300. For example, the fourth pin member 324b may be spaced apart from the second pin member 323b in the length direction (Y-axis direction) of the hinge structure 300. For example, each of the spacings between the second pin member 323b and the fourth pin member 324b in the length direction (Y-axis direction) and/or the height direction (Z-axis direction) of the hinge structure 300 may be substantially the same as the spacing between the second detent member 400b and the fourth detent member 400d in the length direction (Y-axis direction) and/or height direction (Z-axis direction) of the hinge structure 300.

In an embodiment, the third detent member 400c (e.g., third detent hole) may include a plurality of hole areas 430a and at least one connection area 440a connected with the third pin member 324a. For example, the third detent member 400c may include a fifth hole area 431, a sixth hole area 432, a seventh hole area 433, and/or an eighth hole area 434. For example, the third detent member 400c may include a fourth connection area 441, a fifth connection area 442, and/or a sixth connection area 443. In an embodiment, the first pin member 323a and the third pin member 324a may slide along the first detent slot 401 and the third detent slot 403 based on rotation of the first housing 210 (e.g., the first housing 210 of FIGS. 2 to 4) and/or the second housing 220 (e.g., the second housing 220 of FIGS. 2 to 4). For example, the first pin member 323a and the third pin member 324a may be moved substantially simultaneously. For example, when the open angle is about 180 degrees, the first pin member 323a may be positioned in the 1-1th hole area 411, and the third pin member 324a may be positioned in the fifth hole area 431 (e.g., the state shown in FIG. 16). For example, when the open angle is 0 degrees, the first pin member 323a may be positioned in the fourth hole area 413, and the third pin member 324a may be positioned in the eighth hole area 434. For example, since the first pin member 323a and the third pin member 324a are seated in the hole areas 410a and 430a, respectively, when the open angle is about 180 degrees and/or 0 degrees, the fastening force of the first housing 210 and/or second housing 220 may be strengthened at about 180 degrees and/or 0 degrees as compared with when the first detent member 400a alone is provided. The description of the third detent member 400c made above in connection with FIGS. 16 and 17 may be likewise applied to the fourth detent member 400d of FIGS. 14 and 15. For example, the fourth detent member 400d may be a mirror image of the second detent member 400b with respect to the width direction (X-axis direction) of the hinge structure 300.

According to an embodiment, the third detent member 400c may additionally provide a number of open angles at which the fastening force of the first housing 210 and/or second housing 220 has been strengthened. For example, the open angle, at which the fastening force of the first housing 210 and/or second housing 220 has been strengthened, provided by the third detent member 400c may partially differ from that of the first detent member 400a. For example, the open angle corresponding to the state in which the third pin member 324a is seated in the sixth hole area 432 may differ from the open angle state in which the first pin member 323a is seated in the 1-2th hole area 412 and/or the 1-3th hole area 413. For example, the open angle corresponding to the state in which the third pin member 324a is seated in the seventh hole area 433 may differ from the open angle state in which the first pin member 323a is seated in the 1-2th hole area 412 and/or the 1-3th hole area 413. For example, in the state in which the first pin member 323a is seated in the 1-2th hole area 412 or the 1-3th hole area 413, the third pin member 324a may be positioned in any one of the connection areas 440a.

Although FIG. 17 illustrates an example in which the first detent member 400a and the third detent member 400c are aligned and arranged, this is merely a conceptual illustration and does not limit the arrangement relationship between the first detent member 400a and the third detent member 400c.

Figure 18A:
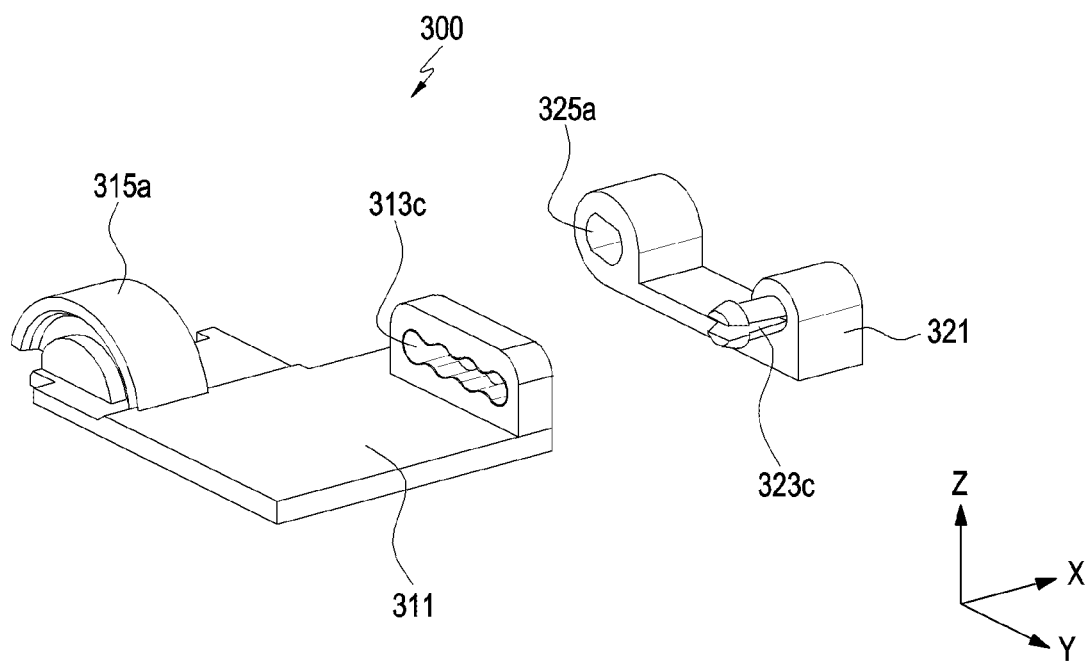
FIG. 18A is an exploded perspective view illustrating some components of a hinge structure according to an embodiment of the disclosure.
Figure 18B:
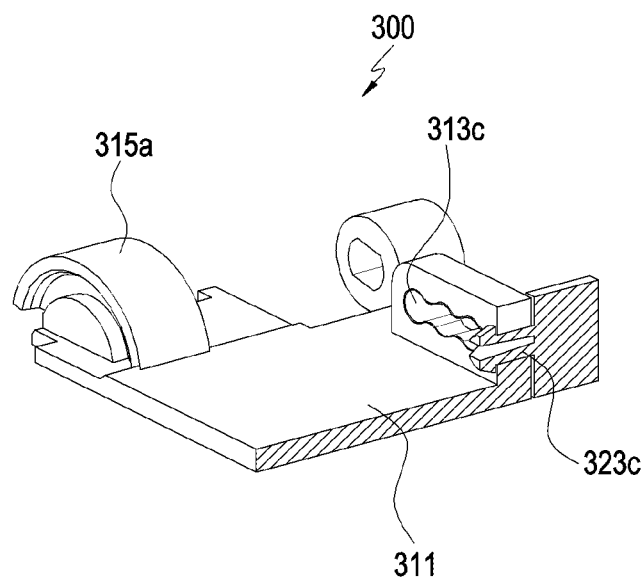
FIG. 18B is a perspective view illustrating a cross-section in which some components of the hinge structure of FIG. 18A are coupled according an embodiment of the disclosure.

FIG. 18A is an exploded perspective view illustrating some components of a hinge structure according to an embodiment of the disclosure. FIG. 18B is a perspective view illustrating a cross-section in which some components of the hinge structure of FIG. 18A are coupled according an embodiment of the disclosure.

The hinge structure 300 of FIGS. 18A and 18B may include a first rotational member 311, a first arm member 321 that rotates and slides in conjunction with the first rotational member 311, and a pin elastic member (323c).

Hereinafter, the hinge structure 300 will be described in relation to the first rotating member 311 and the first arm member 321, but the related description may be designed identically or similarly to the second rotating member (eg, 312 of FIGS. 7 and 8) and the second arm member (eg, 322 of FIGS. 7 and 8).

The configuration of the hinge structure of FIGS. 18A and 18B may be the same in whole or in part as the configuration of the hinge structure of FIGS. 4 to 17. Components of the hinge structure of FIGS. 18A and 18B may be selectively combined with components of the hinge structure of FIGS. 4 to 17.

According to an embodiment, the pin elastic member (323c) can slide in the direction of arrow ①in FIG. 7 within the through slot (313c) formed in the first rotating member (311). According to an embodiment, the through slot 313c may have a fixed shape and have a predetermined thickness in the width direction (X-axis direction) of the hinge structure 300 For example, at least a portion of the elastic pin member 323c may be accommodated in the through slot 313c formed in the first rotating member 311. The through slot 313c may have a shape surrounding at least a portion of the accommodated pin elastic member 323c.

According to an embodiment, a cross section in the width direction (X-axis or Y-axis direction) of the pin elastic member 323c may correspond to a circular shape. However, the shape of the cross section in the width direction of the pin elastic member 323c is not limited to a circular shape. For example, the cross section in the width direction of the pin elastic member 323c may have various shapes such as an ellipse or a polygon (e.g., a quadrangle or a pentagon).

According to an embodiment, the through slot 313c formed in the first rotation member 311 may have a fixed shape that does not have elasticity and may have a shape corresponding to the detent member 400 of FIGS. 7 to 14. For example, the shape of the through slot 313c may be formed by a combination of a plurality of hole areas and connection areas like the shape of the detent member of FIGS. 9A, 9B and 13. According to an embodiment, the pin elastic member 323*c* can slide in the through slot 313*c*, by the elastic force of the pin elastic member 323*c* itself, it is possible to form a force limiting the sliding movement according to the section.

According to an embodiment, the pin elastic member 323*c* may include a groove having one end opened so as to provide an elastic force in the through slot 313*c*. The grooves have different intervals corresponding to the area of the through slot 313*c* (e.g., the hole area and the connection area are alternately arranged), so that the edge of the through slot 313*c* (e.g., the inside of the first rotating member 311) inner side) can provide different elastic forces. According to an embodiment, the pin elastic member 323*c* is formed of a support body for maintaining rigidity of the core portion so as to provide an elastic force in the through slot 313*c*, and the outer circumferential surface of the core may be formed such that an elastic layer formed of an elastic material surrounds the core portion. The elastic layer may provide different elastic forces to the edge of the through slot 313*c* (e.g., the inner side of the first rotating member 311), corresponding to the area of the through slot 313*c* (e.g., the hole area and the connection area are alternately arranged).

According to an embodiment, at least a portion of the pin elastic member 323*c* may be formed of an elastic body. The elastic body of the pin elastic member 323*c* may include various materials providing elastic force equal to or greater than a specified value. According to an embodiment, at least, at least a portion of the pin elastic member 323*c* may include a metal such as nickel and chromium. For example, at least a portion of the pin elastic member 323*c* may include austenitic stainless steel. As another example, at least a portion of the pin elastic member 323*c* may include a spring metal such as 304 stainless steel or 301 stainless steel.

According to an embodiment, the pin elastic member (323*c*) provides a force (eg, fixing force) to the first rotation member 311, the first housing (eg, 210 in FIG. 4) and the second housing (eg, FIG. 220 in 4) can be positioned at any angle. For example, the pin elastic member 323*c* may provide force (eg, elastic force) acting in the width direction. For example, when the pin elastic member 323*c* has a circular cross section in the width direction, a force (eg, elastic force) provided by the pin elastic member 323*c* may act in a normal (perpendicular) direction on an outer circumferential surface of the pin elastic member 323*c*.

An electronic device (e.g., a portable terminal) includes a display with a flat surface or both a flat and curved surface. An electronic device including a display may have a limitation in realizing a screen larger than the size of the electronic device due to the fixed display structure. Therefore, foldable electronic devices are being studied. For example, the foldable device may implement a free-stop function capable of fixing the open angle when opening or closing two housings for user convenience. For example, the free-stop function may be typically implemented in a manner to provide compressive force to the cam structures, which are engaged with each other at a specific rotational angle of the hinge, by an elastic member. For example, the cam-type free-stop structure may require high dimensional accuracy in manufacturing a sophisticated cam structure. For example, the elastic member pressurizing the cam structure may extend in the length direction of the interlocking axis in the hinge structure and increase the overall hinge structure mounting space.

According to embodiments of the disclosure, there may be provided a hinge structure implementing a free-stop function without a cam structure using an elastic detent member (e.g., detent spring) and an electronic device including the same. The disclosure is not limited to the foregoing embodiments of the disclosure but various modifications or changes may rather be made thereto without departing from the spirit and scope of the disclosure.

According to an example embodiment of the disclosure, an electronic device (e.g., 101 of FIG. 1 or 200 of FIGS. 2 to 4) may comprise: a first housing (e.g., the first housing 210 of FIGS. 2 to 4), a hinge structure (e.g., 280 of FIG. 4 or 300 of FIGS. 5 and 14), and/or a display (e.g., 230 of FIGS. 2 and 4). The hinge structure may be rotatably connect the second housing to the first housing. At least a portion of the display may be bendable in respond to the rotation. According to an example embodiment, the hinge structure may include a first rotating member (e.g., 311 of FIGS. to 8 and 10 to 12B or 311 of FIGS. 14 to 16), a second rotating member (e.g., 312 of FIGS. 5 to 8, 10, 11A, and 12A, or 312 of FIGS. 14 and 15), a first detent member (e.g., 401 of FIGS. 7 to 9A and 11A to 12B, 401 of FIG. 13, or 401 of FIGS. 14 to 17), a second detent member (e.g., 402 of FIGS. 7, 8, 9B to 11A, and 12A, or 402 of FIGS. 14 and 15), a first pin member (e.g., 323*a* of FIGS. 7, 8, 10 to 12B, or 323*a* of FIGS. 14 to 16), and/or a second pin member (e.g., 323*b* of FIGS. 7, 8, 10, 11A, and 12B, or 323*b* of FIGS. 14 to 16). The first rotating member may be coupled to the first housing and rotatable about a first rotational axis (e.g., Ax1 of FIG. 5). The second rotating member may be coupled to the second housing and rotatable about a second rotational axis (e.g., Ax2 of FIG. 5) parallel to the first rotational axis. The first detent member may be disposed in the first rotating member and may include a first detent slot (e.g., 401 of FIGS. 9A, 11B, and 12B). The second detent member may be disposed in the second rotating member and may include a second detent slot (e.g., 402 of FIG. 9B). The first pin member may be slidably connected to the first detent slot. The second pin member may be slidably connected to the second detent slot. The first detent member may be configured to provide an elastic force to the first pin member in a width direction (e.g., the direction indicated by the arrow of FIG. 11B) of the first pin member. The second detent member may be configured to provide an elastic force to the second pin member in a width direction (e.g., the direction indicated by the arrow of FIG. 11B) of the second pin. For example, the first pin member and/or the second pin member may be configured to slide in conjunction with rotation of the first housing and/or the second housing.

According to an example embodiment, the first detent member may be configured to provide elastic force in a direction perpendicular to an axis of the first pin member. The second detent member may be configured to provide elastic force in a direction perpendicular to an axis of the second pin member.

According to an example embodiment, the first detent member may be configured to provide elastic force to press the outer circumferential surface of the first pin member in at least one direction. The second detent member may be configured to provide elastic force to press the outer circumferential surface of the second pin member in at least one direction.

According to an example embodiment, each of the elastic forces of the first detent member and the second detent member may be a first designated value or more. For example, when an external force equal to or less than the first designated value applied to at least one of the first housing or the second housing, an angle between the first housing and the second housing may be maintained.

According to an example embodiment, the first detent member (e.g., the first detent slot) may include at least one first hole area (e.g., 410*a* or 411, 412, 413, and 414 of FIG. 9A) accommodating at least a portion of the first pin member. The second detent member (e.g., the second detent slot) may include at least one second hole area (e.g., 410*b* or 415, 416, 417, and 418 of FIG. 9B) accommodating at least a portion of the second pin member.

According to an example embodiment, the first detent member (e.g., the first detent slot) may include a plurality of first hole areas spaced apart from each other in a sliding direction (e.g., the arrow ①direction of FIG. 7) and at least one first connection area (e.g., 420*a* or 421, 422, and 423 of FIG. 9A) connecting the first hole areas neighboring each other among the plurality of first hole areas. According to an example embodiment, the second detent member (e.g., the second detent slot) may include a plurality of second hole areas spaced apart from each other in the sliding direction and at least one second connection area (e.g., 420*b* or 424, 425, and 426 of FIG. 9B) connecting the second hole areas neighboring each other among the plurality of first hole areas.

According to an example embodiment, the first pin may be configured to receive larger elastic forces based on being positioned in the at least one first connection area than based on being positioned in the plurality of first hole areas. The second pin may be configured to receive larger elastic force based on being positioned in the at least one second connection area than based on being positioned in the plurality of second hole areas.

According to an example embodiment, the first pin may be configured to elastically deform at least portion of the at least one first connection area based on being positioned in the at least one first connection area. The second pin may be configured to elastically deform the at least one second connection area based on being positioned in the at least one second connection area.

According to an example embodiment, the height of the at least one first connection area (e.g., the height measured in the height direction (e.g., Z-axis direction) of the electronic device or the hinge structure) may be less than a maximum height (e.g., d2 of FIG. 9A) of the plurality of first hole areas. The height of the at least one second connection area may be less than a maximum height (e.g., d2 of FIG. 9B) of the plurality of second hole areas.

According to an example embodiment, based on the first pin being positioned in one of the plurality of first hole areas (411, 412, 413, 414), the second pin is positioned in one of the plurality of second hole areas (415, 416, 417, 418) corresponding to first hole area in which the first pin is disposed and the first housing and the second housing form a designated angle.

According to an example embodiment, the plurality of first hole areas are spaced apart from each other by a specified interval. The plurality of second hole areas are spaced apart from each other by a specified interval. For example, the intervals between the plurality of first hole areas and the plurality of second hole areas may be substantially the same.

According to an example embodiment, at least some of the plurality of first hole areas are spaced apart from each other by a different interval. At least some of the plurality of second hole areas are spaced apart from each other by a different interval.

According to an example embodiment, at least some of a plurality of the first connection areas (e.g., 421, 422, 423) have a different minimum height (e.g., d3 of FIG. 9A). At least some of a plurality of the second connection areas (424, 425, 426) have a different minimum height (e.g., d3 of FIG. 9A).

According to an example embodiment, the hinge structure may include a first arm member (e.g., 321 of FIGS. 5 to 8, 10, 11A, and 12A or 321 of FIGS. 14 and 15) and/or a second arm member (e.g., 322 of FIGS. 5 to 8, 10, 11A, and 12A or 322 of FIGS. 14 and 15). The first arm member may include the first pin and be configured to slide relative to the first rotating member based on rotation of the first housing. The second arm member may include the second pin member and be configured to slide relative to the second rotating member based on rotation of the second housing.

According to an example embodiment, the first arm member may be configured to interlock rotation of the first housing and rotation of the second housing. The second arm member may be configured to interlock rotation of the first housing and rotation of the second housing.

According to an example embodiment, the hinge structure may include a third detent member (e.g., 400*c* of FIGS. 14 to 17), a fourth detent member (e.g., 400*d* of FIGS. 14 to 17), a third pin member (e.g., 324*a* of FIGS. 14 to 16), and/or a fourth pin member (e.g., 324*b* of FIGS. 14 and 15). The third detent member may be disposed on a surface of the first rotating member to be spaced apart in a direction away from the first detent member and may include a third detent slot (e.g., G3 of FIGS. 16 and 17). The fourth detent member may be disposed on a surface of the second rotating member to be spaced apart from the second detent member in a direction away from the display and may include a fourth detent slot (not shown). The third pin member may be connected to the third detent slot to be slidable in conjunction with rotation of the first housing. The fourth pin member may be connected to the fourth detent slot to be slidable in conjunction with rotation of the second housing.

According to an example embodiment, the first detent slot (e.g., 401 of FIG. 9A or 401 of FIGS. 16 and 17) may include a plurality of hole areas (e.g., 410*a*, or 411, 412, 413, and 414 of FIG. 9A or 17) spaced apart from each other in the sliding direction and at least one connection area (e.g., 420*a* or 421, 422, and 423 of FIG. 9A or 17) connecting hole areas neighboring each other among the plurality of hole areas. The second detent slot may include a plurality of hole areas (e.g., 410*b*, or 415, 416, 417, and 418 of FIG. 9B) spaced apart from each other in the sliding direction and at least one connection area (e.g., 420*b* or 424, 425, and 426 of FIG. 9B) connecting the hole areas neighboring each other. The third detent slot (e.g., 403 of FIG. 17) may include a plurality of hole areas (e.g., 430*a*, or 431, 432, 433, and 434 of FIG. 17) spaced apart from each other in the sliding direction and at least one connection area (e.g., 440*a* or 441, 442, 443, and 444 of FIG. 17) connecting hole areas neighboring each other among the plurality of hole areas. The fourth detent slot may include a plurality of hole areas (not shown) spaced apart from each other in the sliding direction and at least one connection area (not shown) connecting the hole areas neighboring each other among the plurality of hole areas.

According to an example embodiment, the third detent slot may include at least one first additional hole area (e.g., 432 and 433 of FIG. 17). Based on the third pin member being seated in the first additional hole area, at least a portion of the first pin member may be positioned in first connection area (421, 422, 423) of the first detent slot. The fourth detent slot may include at least one second additional hole area (not shown). Based on the fourth pin member being seated in the second additional hole area, at least a portion of the second pin member may be positioned in second connection area (424, 425, 426) of the second detent slot.

For example, the number of open angles at which the fastening force is strengthened using the detent member may correspond to the number of hole areas, so that an increase in number may be limited. For example, if the number of open angles of the electronic device, at which the fastening force is strengthened and distributed between about 90 degrees and about 180 degrees and frequently used by the user in practice, is increased by the additional hole areas, the total number of the open angles may be maintained while enhancing the usability of the electronic device.

According to an example embodiment of the disclosure, the first detent slot may include a 1-1 hole area (411), a 1-2 hole area (412), and a 1-3 hole area (413) spaced apart from each other in a direction away from the first rotation axis (Ax1). The second detent slot may include a 2-1 hole area (415), a 2-2 hole area (416), and a 2-3 hole area (417) spaced apart from each other in a direction away from the second rotation axis (Ax2).

According to an example embodiment of the disclosure, when the angle between the first housing and the second housing is a first specified angle (x1), the first pin member (323*a*) may be located in the 1-1 hole area (411) of the first detent member, and the second pin member (323*b*) may be located in the 2-1 hole area (415) of the second detent member.

According to an example embodiment of the disclosure, when the angle between the first housing and the second housing is a second specified angle (x2) smaller than the first specified angle, the first pin member (323*a*) may be located in the 1-2 hole area (412) of the first detent member, and the second pin member (323*b*) may be located in the 2-2 hole area (416) of the second detent member.

According to an example embodiment of the disclosure, when the angle between the first housing and the second housing is a third specified angle (x3) smaller than the second specified angle, the first pin member (323*a*) is located in the 1-3 hole area (413) of the first detent member, and the second pin member (323*b*) is located in the 2-3 hole area (417) of the second detent member.

According to an example embodiment of the disclosure, the hinge structure may include a first arm member (321) including the first pin member and a first through hole (325*a*) spaced apart from the first pin member, and/or a second arm member (322) including the second pin member and a second through hole (325*b*) spaced apart from the second pin member.

According to an example embodiment of the disclosure, when the first housing (210) rotates based on the first rotational axis (Ax1), the first arm member may rotate about a first interlocking axis (Ax3) that is parallel to the first rotational axis (Ax1) and is the center of the first through hole, and the first pin member may be configured to relatively slide with respect to the first rotating member.

According to an example embodiment of the disclosure, when the second housing (220) rotates based on the second rotational axis (Ax2), the second arm member may be rotate about a second interlocking axis (Ax4) that is parallel to the second rotational axis (Ax2) and is the center of the second through hole, and the second pin member may be configured to relatively slide with respect to the second rotating member.

According to an example embodiment of the disclosure, an electronic device (e.g., 101 of FIG. 1 or 200 of FIGS. 2 to 4) may comprise: a first housing (e.g., the first housing 210 of FIGS. 2 to 4), a hinge structure (e.g., 280 of FIG. 4 or 300 of FIGS. 5 and 14), a display (e.g., 230 of FIGS. 2 and 4), and/or a detent member (e.g., 400 of FIG. 7 or 400 of FIG. 14). The hinge structure may be rotatably connect the second housing to the first housing. At least a portion of the display may be bendable in response to the rotation of the second housing relative to the first housing. The display may be a flexible display disposed across a surface of the first housing, the hinge structure, and a surface of the second housing. The detent member may include a detent member including a first detent member (e.g., 400*a* of FIGS. 7 to 9A and 11A to 12B, 400*a* of FIG. 13, or 400*a* of FIGS. 14 to 17) disposed in the first housing and/or a second detent member (e.g., 400*b* of FIGS. 7, 8, 9B to 11A, and 12A or 400*b* of FIGS. 14 and 15) disposed in the second housing. According to an example embodiment, the hinge structure may include a first rotating member (e.g., 301 of FIGS. 5 to 8 and 10 to 12B or 311 of FIGS. 14 to 16), a second rotating member (e.g., 312 of FIGS. 5 to 8, 10, 11A, and 12A, or 312 of FIGS. 14 and 15), a first pin member (e.g., 323*a* of FIGS. 7, 8, 10 to 12B, or 323*a* of FIGS. 14 to 16), and/or a second pin member (e.g., 323*b* of FIGS. 7, 8, 10, 11A, and 12B, or 323*b* of FIGS. 14 to 16). The first rotating member may be coupled to the first housing and rotatable about a first rotational axis (e.g., Ax1 of FIG. 5). The first rotating member may include a first through hole (e.g., 313*a* of FIGS. 8, 11*b*, and 12*b*, 313*a* of FIG. 13, or 313*a* of FIGS. 15 and 16) receiving at least a portion of the first detent member. The second rotating member may be coupled to the second housing and rotatable about a second rotational axis (e.g., Ax2 of FIG. 5) parallel to the first rotational axis. The second rotating member may include a second through hole (e.g., 313*b* of FIG. 8 or 313*b* of FIG. 15) receiving at least a portion of the second detent member. The first pin member may be slidably connected to the first detent member in conjunction with rotation of the first housing. The second pin member may be slidably connected to the second detent member in conjunction with rotation of the second housing. The first detent member may include a first detent slot (e.g., 401 of FIGS. 9A, 11B and 12B) receiving at least a portion of the first pin member. The first detent member may be configured to provide an elastic force to the first pin in a width direction (e.g., the direction indicated by the arrow of FIG. 11B) of the first pin member. The second detent member may include a second detent slot (e.g., 402 of FIG. 9B) receiving at least a portion of the second pin member. An elastic force may be configured to be provided to the second pin member in a width direction (e.g., the direction indicated by the arrow of FIG. 11B) of the second pin member.

According to an example embodiment, each of the elastic forces of the first detent member and the second detent member may be a first designated value or more. For example, when an external force equal to or less than the first designated value applied to at least one of the first housing or the second housing, an angle between the first housing and the second housing may be maintained.

According to an example embodiment, the first detent member (e.g., the first detent slot) may include a plurality of first hole areas spaced apart from each other in a sliding direction (e.g., the arrow ① direction of FIG. 7) and at least one first connection area (e.g., 420*a* or 421, 422, and 423 of FIG. 9A) connecting first hole areas neighboring each other among the plurality of first hole areas. According to an example embodiment, the second detent member (e.g., the second detent slot) may include a plurality of second hole areas spaced apart from each other in the sliding direction and at least one second connection area (e.g., 420*b* or 424,

425, and 426 of FIG. 9B) connecting second hole areas neighboring each other among plurality of second hole areas.

According to an example embodiment, the first pin member may be configured to receive a larger elastic force based on being positioned in the at least one first connection areas than based on being positioned in the plurality of first hole areas and be configured to elastically deform at least portion of the at least one first connection area. The second pin member may be configured to receive a larger elastic force based on being positioned in the at least one second connection areas than based on being positioned in the plurality of second hole areas and be configured to elastically deform at least portion of the at least one second connection area.

According to an example embodiment, based on the first pin member being positioned in one of the plurality of first hole areas (e.g., 411, 412, 413, 414), the second pin member is configured to be positioned in one of the plurality of second hole areas (e.g., 415, 416, 417, 418) corresponding to first hole area in which the first pin member is disposed, and the first housing and the second housing form a designated angle.

The detent member of the disclosure may have a simpler shape than the cam structure. The detent member of the disclosure may more easily manage the dimensional accuracy as compared with the conventional cam-type free-stop structure, providing enhanced quality and functional reliability. The detent member of the disclosure may replace an accurate cam structure, cam plate, and compression spring which implements a general free-stop structure, simplifying the free-stop structure and reducing the overall mounting space of the hinge structure in the electronic device.

Effects derived from the embodiments of the disclosure are not limited to the foregoing effects, and may be expanded in various ways without departing from the spirit and scope of the disclosure.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a first housing;
   a second housing;
   a hinge structure rotatably connecting the second housing to the first housing; and
   a flexible display at least partially bendable in response to the rotation of the second housing relative to the first housing;
   wherein the hinge structure includes,
   a first rotating member coupled to the first housing and rotatable about a first rotational axis;
   a second rotating member coupled to the second housing and rotatable about a second rotational axis parallel to the first rotational axis;
   a first detent member disposed in the first rotating member and including a first detent slot;
   a second detent member disposed in the second rotating member and including a second detent slot;
   a first pin member slidably connected to the first detent slot; and
   a second pin member slidably connected to the second detent slot, and
   wherein the first detent member is configured to provide an elastic force to the first pin member, and the second detent member is configured to provide an elastic force to the second pin member.

2. The electronic device of claim 1, wherein each of the elastic forces of the first detent member and the second detent member is a first designated value or more, and
   wherein based on an external force equal to or less than the first designated value being applied to at least one of the first housing or the second housing, an angle between the first housing and the second housing is maintained.

3. The electronic device of claim 1, wherein the first detent slot includes at least one first hole area configured to accommodate at least a portion of the first pin member, and
   wherein the second detent slot includes at least one second hole area configured to accommodate at least a portion of the second pin member.

4. The electronic device of claim 1,
   wherein the first detent slot includes:
   a plurality of first hole areas spaced apart from each other in a sliding direction; and
   at least one first connection area connecting first hole areas neighboring each other among the plurality of first hole areas, and
   wherein the second detent slot includes:
   a plurality of second hole areas spaced apart from each other in a sliding direction; and
   at least one second connection area connecting second hole areas neighboring each other among the plurality of second hole areas.

5. The electronic device of claim 4, wherein the first pin member is configured to receive larger elastic forces based on being positioned in the at least one first connection area than based on being positioned in the plurality of first hole areas, and the second pin member is configured to receive larger elastic forces based on being positioned in the at least one second connection area than based on being positioned in the plurality of second hole areas.

6. The electronic device of claim 4, wherein the first pin member is configured to elastically deform at least portion of the at least one first connection area based on being positioned in the at least one first connection area, and the second pin member is configured to elastically deform at least portion of the at least one second connection area based on being positioned in the at least one second connection area.

7. The electronic device of claim 4, wherein a height of the at least one first connection area is less than maximum heights of the plurality of first hole areas, and a height of the at least one second connection area is less than heights of the plurality of second hole areas.

8. The electronic device of claim 4,
   wherein based on the first pin member being positioned in one of the plurality of first hole areas,
   the second pin member is positioned in one of the plurality of second hole areas corresponding to first hole area in which the first pin member is disposed, and
   the first housing and the second housing form a designated angle.

9. The electronic device of claim 3, wherein the plurality of first hole areas are spaced apart from each other by a specified interval, and the plurality of second hole areas are spaced apart from each other by a specified interval.

10. The electronic device of claim 4, wherein at least some of the plurality of first hole areas are spaced apart from each other by a different interval, and at least some of the plurality of second hole areas are spaced apart from each other by a different interval.

11. The electronic device of claim 4, wherein at least some of a plurality of the first connection areas have a different minimum height, and at least some of a plurality of the second connection areas have a different minimum height.

12. The electronic device of claim 1, wherein the hinge structure includes,
   a first arm member including the first pin member and configured to slide relative to the first rotating member based on rotation of the first housing; and
   a second arm member including the second pin member and configured to slide relative to the second rotating member based on rotation of the second housing, and
   wherein the first arm member and the second arm member are configured to interlock the rotation of the first housing and the rotation of the second housing.

13. The electronic device of claim 1, wherein the hinge structure includes,
   a third detent member disposed in the first rotating member to be spaced apart from the first detent member in a direction away from the display and including a third detent slot;
   a fourth detent member disposed in the second rotating member to be spaced apart from the second detent member in a direction away from the display and including a fourth detent slot;
   a third pin member connected to the third detent slot to be slidable in conjunction with rotation of the first housing; and
   a fourth pin member connected to the fourth detent slot to be slidable in conjunction with rotation of the second housing.

14. The electronic device of claim 13, wherein each of the first detent slot, the second detent slot, the third detent slot, and the fourth detent slot includes,
- a plurality of hole areas spaced apart from each other in the sliding direction; and
- at least one connection area connecting hole areas neighboring each other among the plurality of hole areas.

15. The electronic device of claim 14, wherein the third detent slot includes at least one first additional hole area, wherein at least a portion of the first pin member is configured to be positioned in a first connection area of the first detent slot based on the third pin member being seated in the first additional hole area,
- wherein the fourth detent slot includes at least one second additional hole area, and wherein at least a portion of the second pin member is configured to be positioned in a second connection area of the second detent slot based on the fourth pin member being seated in the second additional hole area.

16. The electronic device of claim 1, wherein the first detent slot includes a 1-1 hole area, a 1-2 hole area, and a 1-3 hole area spaced apart in a direction away from the first rotational axis Ax1, the second detent slot includes a 2-1 hole area, a 2-2 hole area, and a 2-3 hole area spaced apart in a direction away from the second rotation axis Ax2,
- wherein when an angle between the first housing and the second housing is a first specified angle, the first pin member is located in the 1-1 hole area of the first detent member, and the second pin member is located in the 2-1 hole area of the second detent member,
- wherein when an angle between the first housing and the second housing is a second specified angle larger than the first specified angle, the first pin member is located in the 1-2 hole area of the first detent member, and the second pin member is located in the 2-2 hole area of the second detent member, and
- wherein when an angle between the first housing and the second housing is a third specified angle larger than the second specified angle, the first pin member is located in the 1-3 hole area of the first detent member, and the second pin member is located in the 2-3 hole area of the second detent member.

17. The electronic device of claim 1, wherein the hinge structure includes a first arm member including the first pin member and a first through hole spaced apart from the first pin member, and a second arm member including the second pin member and a second through hole spaced apart from the second pin member,
- Wherein when the first housing rotates based on the first rotational axis, the first arm member rotates about a first interlocking axis that is parallel to the first rotational axis and is the center of the first through hole, and the first pin member is configured to relatively slide with respect to the first rotating member,
- Wherein when the second housing rotates based on the second rotational axis, the second arm member rotates about a second interlocking axis that is parallel to the second rotational axis and is the center of the second through hole, and the second pin member is configured to relatively slide with respect to the second rotating member.

18. An electronic device comprising:
- a first housing;
- a second housing;
- a hinge structure rotatably connecting the second housing to the first housing;
- a flexible display; and
- a detent member including a first detent member disposed in the first housing and a second detent member disposed in the second housing,
- wherein the hinge structure includes,
- a first rotating member coupled to the first housing, rotatable about a first rotational axis, and including a first through hole configured to receive at least a portion of the first detent member;
- a second rotating member coupled to the second housing, rotatable about a second rotational axis parallel to the first rotational axis, and including a second through hole configured to receive at least a portion of the second detent member;
- a first pin member slidably connected to the first detent member; and
- a second pin member slidably connected to the second detent member, and
- wherein the first detent member includes a first detent slot configured to receive at least a portion of the first pin member and configured to provide an elastic force to the first pin member, and
- the second detent member includes a second detent slot configured to receive at least a portion of the second pin member and configured to provide an elastic force to the second pin member.

19. The electronic device of claim 18, wherein each of the elastic forces of the first detent member and the second detent member is a first designated value or more, and
- wherein based on an external force equal to or less than the first designated value being applied to at least one of the first housing or the second housing, an angle between the first housing and the second housing is maintained.

20. The electronic device of claim 18,
- wherein the first detent slot and the second detent slot includes a plurality of first hole areas spaced apart from each other in a sliding direction of the first pin, and at least one first connection area connecting first hole areas neighboring each other among the plurality of first hole areas, and
- wherein the second detent slot includes a plurality of second hole areas spaced apart from each other in a sliding direction of the second pin, and at least one second connection area connecting second hole areas neighboring each other among plurality of second hole areas.

* * * * *